US012698348B2

(12) United States Patent
Antle et al.

(10) Patent No.: US 12,698,348 B2
(45) Date of Patent: Aug. 4, 2026

(54) ALKYLATED CYCLODEXTRIN COMPOSITIONS AND PROCESSES FOR PREPARING AND USING THE SAME

(71) Applicant: CYDEX PHARMACEUTICALS, INC., Emeryville, CA (US)

(72) Inventors: Vincent D. Antle, Olate, KS (US); Andre Fernandes, Loures (PT); Mariana Rodrigues, Loures (PT); Claudio Vilela, Loures (PT)

(73) Assignee: CyDex Pharmaceuticals, Inc., Lawrence, KS (US)

( * ) Notice: Subject to any disclaimer, the term of this patent is extended or adjusted under 35 U.S.C. 154(b) by 622 days.

(21) Appl. No.: 18/246,284

(22) PCT Filed: Sep. 23, 2021

(86) PCT No.: PCT/US2021/051825

§ 371 (c)(1),
(2) Date: Mar. 22, 2023

(87) PCT Pub. No.: WO2022/066958

PCT Pub. Date: Mar. 31, 2022

(65) Prior Publication Data

US 2023/0357451 A1     Nov. 9, 2023

Related U.S. Application Data

(60) Provisional application No. 63/082,769, filed on Sep. 24, 2020.

(51) Int. Cl.
| | |
|---|---|
| *C08B 37/16* | (2006.01) |
| *B01D 3/14* | (2006.01) |
| *B01D 61/02* | (2006.01) |
| *B01D 61/58* | (2006.01) |
| *B01D 69/02* | (2006.01) |
| *B01J 20/20* | (2006.01) |
| *B01J 20/28* | (2006.01) |
| *B01J 20/30* | (2006.01) |
| *B01J 20/34* | (2006.01) |
| *C08B 37/00* | (2006.01) |
| *B01D 61/14* | (2006.01) |

(52) U.S. Cl.
CPC .......... *C08B 37/0012* (2013.01); *B01D 3/145* (2013.01); *B01D 61/027* (2013.01); *B01D 61/58* (2013.01); *B01D 69/02* (2013.01); *B01J 20/20* (2013.01); *B01J 20/28016* (2013.01); *B01J 20/3071* (2013.01); *B01J 20/3416* (2013.01); *C08B 37/0003* (2013.01); *B01D 61/145* (2013.01); *B01D 2311/04* (2013.01); *B01D 2311/06* (2013.01); *B01D 2315/16* (2013.01)

(58) Field of Classification Search
CPC ................................................. C08B 37/0012
See application file for complete search history.

(56) References Cited

U.S. PATENT DOCUMENTS

| | | | |
|---|---|---|---|
| 3,033,900 A | 5/1962 | Holstein |
| 3,426,011 A | 2/1969 | Parmerter et al. |
| 3,453,257 A | 7/1969 | Parmerter et al. |
| 3,453,259 A | 7/1969 | Parmerter et al. |
| 3,459,731 A | 8/1969 | Gramera et al. |
| 4,317,881 A | 3/1982 | Yagi et al. |
| 4,477,568 A | 10/1984 | Hokse et al. |
| 4,597,946 A | 7/1986 | Ward |
| 4,658,058 A | 4/1987 | Umezawa et al. |
| 4,727,064 A | 2/1988 | Pitha |
| 4,738,923 A | 4/1988 | Ammeraal |
| 4,835,105 A | 5/1989 | Seres |
| 4,904,306 A | 2/1990 | Ammeraal |
| 4,920,214 A | 4/1990 | Friedman |
| 5,007,967 A | 4/1991 | Ammeraal |
| 5,019,562 A | 5/1991 | Folkman |
| 5,134,127 A | 7/1992 | Stella et al. |
| 5,135,919 A | 8/1992 | Folkman |
| 5,173,481 A | 12/1992 | Pitha et al. |
| 5,183,809 A | 2/1993 | Weisz et al. |
| 5,241,059 A | 8/1993 | Yoshinaga |
| 5,257,985 A | 11/1993 | Puhl |
| 5,324,718 A | 6/1994 | Loftsson |
| 5,376,537 A | 12/1994 | Cami et al. |
| 5,376,645 A | 12/1994 | Stella et al. |

(Continued)

FOREIGN PATENT DOCUMENTS

| | | |
|---|---|---|
| CN | 102040675 | 5/2011 |
| CN | 104892797 | 9/2015 |

(Continued)

OTHER PUBLICATIONS

Adam et al., 2002, Cyclodextrin-derived host molecules as reversal agents for the neuromuscular blocker rocuronium bromide: synthesis and structure-activity relationships, J. Med. Chem. 45:1806-1816.
Adams, Julian, "Proteasome Inhibitors as Therapeutic Agents," *Expert Opinion Therapeutic Patents* (2003) 13(1), pp. 45-57.
Aldrich, "Activated Carbon," *Technical Information Bulletin, AL-143, Mineral Adsorbents, Filter Agents and Drying Agents*, Section III.
Armarego et al., "Common Physical Techniques in Purification," *Purification of Laboratory Chemicals Fifth Edition*, Butterworth-Heinemann an Imprint of Elsevier Science, © 2003, pp. 20 and 159.
ASTM International, Jan. 2017, Standard Guide for Application of Continuous Processing in the Pharmaceutical Industry, 15 pp.

(Continued)

*Primary Examiner* — Paul V Ward
(74) *Attorney, Agent, or Firm* — Knobbe, Martens, Olson & Bear, LLP

(57) ABSTRACT

The present disclosure is related to processes for efficient large-scale preparation of alkylated cyclodextrins. The processes of the present disclosure provide high purity alkylated cyclodextrins with high purity and low levels of chloride while improving efficiency, increasing batch size, and reducing total process time.

31 Claims, 1 Drawing Sheet

(56)                References Cited

U.S. PATENT DOCUMENTS

| | | | |
|---|---|---|---|
| 5,393,880 | A | 2/1995 | Shieh et al. |
| 5,438,133 | A | 8/1995 | Moore et al. |
| 5,472,954 | A | 12/1995 | Loftsson |
| 5,479,254 | A | 12/1995 | Woskov et al. |
| 5,512,665 | A | 4/1996 | Uchiyama et al. |
| 5,536,826 | A | 7/1996 | Hirsenkorn |
| 5,550,222 | A | 8/1996 | Shieh |
| 5,569,756 | A | 10/1996 | Qi et al. |
| 5,578,719 | A | 11/1996 | Gadelle et al. |
| 5,594,125 | A | 1/1997 | Seyschab |
| 5,620,872 | A | 4/1997 | Shieh |
| 5,658,390 | A | 8/1997 | Shieh et al. |
| 5,658,894 | A | 8/1997 | Weisz et al. |
| 5,661,151 | A | 8/1997 | Saksena et al. |
| 5,710,268 | A | 1/1998 | Wimmer |
| 5,756,484 | A | 5/1998 | Fuertes et al. |
| 5,760,015 | A | 6/1998 | Joullie et al. |
| 5,831,081 | A | 11/1998 | Reuscher |
| 5,846,954 | A | 12/1998 | Joullie et al. |
| 5,874,418 | A | 2/1999 | Stella et al. |
| 5,914,122 | A | 6/1999 | Otterbeck et al. |
| 5,935,941 | A | 8/1999 | Pitha |
| 6,033,573 | A | 3/2000 | Toles et al. |
| 6,046,177 | A | 4/2000 | Stella et al. |
| 6,133,248 | A | 10/2000 | Stella |
| 6,153,746 | A | 11/2000 | Shah et al. |
| 6,235,505 | B1 | 5/2001 | Grull et al. |
| 6,267,979 | B1 | 7/2001 | Raad et al. |
| 6,316,613 | B1 | 11/2001 | Chen et al. |
| 6,337,302 | B1 | 1/2002 | Teng et al. |
| 6,391,862 | B1 | 5/2002 | Vigh |
| 6,407,079 | B1 | 6/2002 | Muller et al. |
| 6,479,467 | B1 | 11/2002 | Buchanan et al. |
| 6,509,319 | B1 | 1/2003 | Issam |
| 6,524,595 | B1 | 2/2003 | Perrier et al. |
| 6,610,671 | B2 | 8/2003 | Buchanan et al. |
| 6,670,340 | B1 | 12/2003 | Zhang et al. |
| 6,831,099 | B1 | 12/2004 | Crews |
| 6,869,939 | B2 | 3/2005 | Mosher et al. |
| 7,034,013 | B2 | 4/2006 | Thompson et al. |
| 7,582,758 | B2 | 9/2009 | Martin |
| 7,625,878 | B2 | 12/2009 | Stella et al. |
| 7,629,331 | B2 | 12/2009 | Pipkin et al. |
| 7,635,773 | B2 | 12/2009 | Antle |
| 8,114,438 | B2 | 2/2012 | Pipkin et al. |
| 8,236,782 | B2 | 8/2012 | Mosher et al. |
| 8,278,437 | B2 | 10/2012 | Ren et al. |
| 8,410,077 | B2 | 4/2013 | Antle |
| 8,492,538 | B1 | 7/2013 | Matos |
| 9,200,088 | B2 | 12/2015 | Antle |
| 9,493,582 | B2 | 11/2016 | Antle et al. |
| 9,750,822 | B2 | 9/2017 | Antle |
| 9,751,957 | B2 | 9/2017 | Antle et al. |
| 10,040,872 | B2 | 8/2018 | Antle et al. |
| 10,117,951 | B2 | 11/2018 | Antle |
| 10,246,524 | B2 | 4/2019 | Hong et al. |
| 10,323,103 | B2 | 6/2019 | Antle et al. |
| 10,633,462 | B2 | 4/2020 | Antle et al. |
| 10,780,177 | B2 | 9/2020 | Antle et al. |
| 10,800,861 | B2 | 10/2020 | Antle et al. |
| 10,851,184 | B2 | 12/2020 | Antle et al. |
| 11,208,500 | B2 | 12/2021 | Antle et al. |
| 2003/0055023 | A1 | 3/2003 | Rajewski |
| 2003/0232208 | A1 | 12/2003 | Wood et al. |
| 2004/0077594 | A1 | 4/2004 | Nerurkar |
| 2005/0164986 | A1 | 7/2005 | Mosher et al. |
| 2005/0186267 | A1 | 8/2005 | Thompson et al. |
| 2005/0250738 | A1 | 11/2005 | Mosher et al. |
| 2006/0009469 | A1 | 1/2006 | Witchey |
| 2006/0045850 | A1 | 3/2006 | Namburi |
| 2006/0128611 | A1 | 6/2006 | Lewis et al. |
| 2006/0258537 | A1 | 11/2006 | Stella et al. |
| 2007/0020196 | A1 | 1/2007 | Pipkin et al. |
| 2007/0020298 | A1 | 1/2007 | Pipkin et al. |
| 2007/0020299 | A1 | 1/2007 | Pipkin et al. |
| 2007/0020336 | A1 | 1/2007 | Loftsson |
| 2007/0082870 | A1 | 4/2007 | Buchanan |
| 2007/0175472 | A1 | 8/2007 | Pipkin et al. |
| 2007/0202054 | A1 | 8/2007 | Pipkin et al. |
| 2008/0194519 | A1 | 8/2008 | Cloyd |
| 2009/0011037 | A1 | 1/2009 | Pipkin et al. |
| 2009/0012042 | A1 | 1/2009 | Ren et al. |
| 2009/0123540 | A1 | 5/2009 | Pipkin et al. |
| 2009/0239942 | A1 | 9/2009 | Cloyd |
| 2009/0270348 | A1 | 10/2009 | Antle |
| 2010/0093663 | A1 | 4/2010 | Antle |
| 2010/0292268 | A1 | 11/2010 | Mosher et al. |
| 2010/0311838 | A1 | 12/2010 | Pipkin et al. |
| 2011/0224232 | A1 | 9/2011 | Williams, III et al. |
| 2012/0021013 | A1 | 1/2012 | Esaki |
| 2012/0136072 | A1 | 5/2012 | Mosher et al. |
| 2013/0096053 | A1 | 4/2013 | Heimbecher |
| 2013/0303465 | A1 | 11/2013 | Lewis et al. |
| 2013/0331356 | A1 | 12/2013 | Olhava et al. |
| 2014/0046061 | A1 | 2/2014 | Matos |
| 2021/0093727 | A1 | 4/2021 | Antle et al. |
| 2021/0147582 | A1 | 5/2021 | Antle et al. |
| 2022/0332853 | A1 | 10/2022 | Antle et al. |

FOREIGN PATENT DOCUMENTS

| | | | | |
|---|---|---|---|---|
| CN | 104974275 | | 10/2015 | |
| CN | 107129546 | * | 5/2019 | ......... C08B 37/0012 |
| EP | 0 579 435 | | 1/1994 | |
| EP | 0 274 259 | | 2/1994 | |
| EP | 1 067 143 | | 1/2001 | |
| EP | 1 950 227 | | 7/2008 | |
| EP | 2 018 866 | | 1/2009 | |
| EP | 2 261 236 | B1 | 7/2015 | |
| JP | 04-57801 | | 2/1992 | |
| JP | 05-1102 | | 1/1993 | |
| JP | 05-504783 | | 7/1993 | |
| JP | 07-149801 | | 6/1995 | |
| JP | 07-216002 | | 8/1995 | |
| JP | 10-504351 | | 4/1998 | |
| JP | 11-100402 | | 4/1999 | |
| JP | 2001-31703 | | 2/2001 | |
| WO | WO 90/012035 | | 10/1990 | |
| WO | WO 91/11172 | | 8/1991 | |
| WO | WO 99/09997 | | 3/1999 | |
| WO | WO 99/27932 | | 6/1999 | |
| WO | WO 99/42111 | | 8/1999 | |
| WO | WO 01/01955 | | 1/2001 | |
| WO | WO 01/40316 | | 6/2001 | |
| WO | WO 02/055562 | | 7/2002 | |
| WO | WO 03/092590 | | 11/2003 | |
| WO | WO 04/064787 | | 8/2004 | |
| WO | WO 04/064788 | | 8/2004 | |
| WO | WO 05/042584 | | 5/2005 | |
| WO | WO 05/118277 | | 5/2005 | |
| WO | WO 05/111008 | | 11/2005 | |
| WO | WO 06/017842 | | 2/2006 | |
| WO | WO 06/071491 | | 7/2006 | |
| WO | WO 06/108828 | | 10/2006 | |
| WO | WO 06/130177 | | 12/2006 | |
| WO | WO 07/047253 | | 4/2007 | |
| WO | WO 08/005692 | | 1/2008 | |
| WO | WO 08/005802 | | 1/2008 | |
| WO | WO 08/005819 | | 1/2008 | |
| WO | WO 08/034040 | | 3/2008 | |
| WO | WO 08/134600 | | 11/2008 | |
| WO | WO 08/134601 | | 11/2008 | |
| WO | WO 08/140782 | | 11/2008 | |
| WO | WO 09/018069 | | 2/2009 | |
| WO | WO 09/045497 | | 4/2009 | |
| WO | WO 09/129301 | | 10/2009 | |
| WO | WO 09/134347 | | 11/2009 | |
| WO | WO 10/031876 | | 3/2010 | |
| WO | WO 10/053487 | | 5/2010 | |
| WO | WO 13/123254 | | 8/2013 | |

(56)  References Cited

FOREIGN PATENT DOCUMENTS

WO      WO 13/130666      9/2013
WO      WO 16/029179      2/2016

OTHER PUBLICATIONS

Avis et al., Chapter 10, "Parenteral Medications," in Dispensing of Medication (Hoover ed., 8th ed.) (1976 Mack Publishing Co.).

Avis, Kenneth E., "Sterile Products," Chapter 22, in *The Theory and Practice of Industrial Pharmacy* (Lachman, Lieberman and Kanig eds., 3rd ed.) (1986 Lea & Fabiger; Fourth Indian Reprint 1991 Varghese Publishing House).

Bansal et al., 1998, Regioselective alkylation of beta-cyclodextrins, Australian J. Chem., 51(10): 915-923 (abstract only).

Baptista et al., 1996, Near-infrared detection of flow injection analysis by acoustooptic tunable filter-based spectrophotometry, Anal. Chem., 68(6):971-976.

Betadex, January-Feb. 2008, Pharmacopeial Forum, The United States Pharmacopeial Convention, 34(1):127-130.

Boger et al., 1978, Cyclodextrin chemistry. Selective modification of all primary hydroxyl groups of α- and β-cyclodextrins, Helv. Chim. Acta, 61:2190-2218.

Brewster et al., "Comparative interaction of 2-hydroxypropyl-B-cyclodextrin and sulfobutylether-β-cyclodextrin with itraconazole: Phase-solubility behavior and stabilization of supersaturated drug solutions," Eur. J. Pharm. Sci. 34 (2008) pp. 94-103.

Brewster et al., 2007, Cyclodextrins as pharmaceutical solubilizers, Advanced Drug Delivery Reviews 59:645-666.

Brustugun et al., "Formation and reactivity of free radicals in 5-hydroxymethyl-2-furaldehyde—the effect on isoprenaline photostability," *Journal of Photochemistry and Photobiology B: Biology*, 79 (2005) pp. 109-119.

Burdurlu et al., "Effect of storage on nonenzymatic browning of apple juice concentrates," *Food Chemistry*, 80 (2003) 91-97.

Canilha et al., "Eucalyptus hydrolysate detoxification with activated charcoal adsorption or ion-exchange resins for xylitol production," *Process Biochemistry*, 39 (2004) 1909-1912.

Carlson et al., "Effect of pH on Disintegration and Dissolution of Ketoconazole Tablets," *Am J Hosp Pharm.* 1983; 40:1334-1336.

Caturla et al., "Preparation of activated carbon by chemical activation with $ZnCl_2$," Carbon vol. 29, No. 7, pp. 999-1007, 1991.

Certificate of Analysis for Captisol® batch 17CX01.HQ00029 first sold on Feb. 6, 2007 and described in U.S. Pat. No. 7,635,773 (of record).

Certificate of Analysis for Captisol® batch 17CX01.HQ00038 first sold on May 5, 2009 and described in U.S. Pat. No. 7,635,773 (of record).

Certificate of Analysis for Captisol® batch 17CX01.HQ00044 first sold on Nov. 9, 2007 and described in U.S. Pat. No. 7,635,773 (of record).

Challa et al., "Cyclodextrins in Drug Delivery: An Updated Review," AAPS PharmSciTech 2005; 6 (2) Article 43, E329-E357.

ChemicalBook, 2017, 1,4-Butane Sultone, data sheet, 3 pp.

ClinicalTrials.gov, Feb. 21, 2011, Carfilzomib plus panobinostat in relapsed/refractory multiple myeloma (mm), NTC01301807, 8 pp.

Comprehensive Supramolecular Chemistry, vol. 3 Cyclodextrins, Szejtli et al., eds., Elsevier Science Inc., Tarrytown, NY, 1996.

Connors et al., eds., Chemical Stability of Pharmaceuticals, 1st Ed., John Wiley & Sons, New York, 1979, pp. 134-135.

Connors et al., eds., Chemical Stability of Pharmaceuticals, 2nd Ed., John Wiley & Sons, New York, 1986, pp. 564-565, 584-585, 770-771, 776-779.

Crowley et al., Drug-Excipient Interactions, Pharmaceutical Technology, Mar. 2001, pp. 1-6, Advanstar Publication.

Cyclodextrins in Pharmacy, Fromming et al., eds., Kluwer Academic Publishing, Dordrecht, Netherlands, 1994.

Darco G-60, "Does Your Application Require Ultra Pure Activated Carbon? DARCO® G-60 Is Your Answer," ICI Americas Inc., tech sheet. Chem. Eng. News, 1984, 62 (3), p. 5.

Demo et al., "Antitumor Activity of PR-171, a Novel Irreversible Inhibitor of the Proteasome," *Cancer Research* 2007; 67:(13), Jul. 1, 2007, pp. 6383-6391.

Edelman Public Relations, Dec. 28, 2004, Pfizer's antifungal medicine VFEND® receives FDA approval, press release, 2 pp.

Elofsson et al., "Towards subunit-specific proteasome inhibitors: synthesis and evaluation of peptide α',β'-epoxyketones," *Chemistry & Biology* 1999, vol. 6, No. 11, pp. 811-822.

First supplement to USP 35-NF 30, Official Monographs for NF 30, Aug. 1, 2012, Betadex 5423-5426.

Flynn, Gordon L. "Buffers-pH Control within Pharmaceutical Systems," *J. Parenteral Drug Assoc.*, Mar.-Apr. 1980 vol. 34, No. 2, pp. 139-162.

Fridriksdottir et al., 1997, Formulation and testing of methazolamide cyclodextrin eye drop solutions, Journal of Controlled Release, 44(1):95-99.

Fridriksdottir et al., Jan. 1996, Design and in vivo testing of 17β-estradiol HPβCD sublingual tablets, Die Pharmazie, 51(1):39-42.

Fridriksdottir et al., Mar. 31-Apr. 2, 1996, Solubilization of β-cyclodextrin: the effect of polymers andvarious drugs on the solubility of β-cyclodextrin, Proceedings of the Eighth International Symposium on Cyclodextrins, eds. Szejtli et al., Budapest, 373-376.

Furness, Jan. 2006, Partnering with big-pharma: Pfizer & CyDex's positive experience, a case study, Drug Delivery Technology, 6(1):54-56.

Grard et al., "Analysis of sulfobutyl ether-β-cyclodextrin mixtures by ion-spray mass spectrometry and liquid chromotography-ion-spray mass spectrometry," J. Chromatography A, 925 (2001) pp. 79-87.

Grard et al., "Characterization of sulfobutyl ether-β-cyclodextrins mixtures by anion exchange chromatography using evaporative light scattering detection," *J. Chromatography A*, 897 (2000) pp. 185-193.

Grard et al., Sulfobutyl Ether-β-Cyclodextrin Fingerprint Using Ion Pair Reversed-Phase Chromatography, *Chromatographia*, vol. 50, No. 11, Dec. 12, 1999, pp. 695-700.

Greer et al., "Posaconazole (Noxafil): a new triazole antifungal agent," *Baylor University Medical Center Proceeding*, (2007) vol. 20, No. 2, pp. 188-196.

Guieu et al., 2008, Multiple homo- and hetero-functionalization of alpha-cyclodextrin, JOC, 72:2819-2828.

Hachem et al., May 2006, EDTA as an adjunct antifungal agent for invasive pulmonary aspergillosis in a rodent model, Antimicrobial Agents and Chemotherapy, 50(5):1823-1827.

Hallal et al., "Electrochemical Polymerization of Furfural on a Platinum Electrode in Aqueous Solutions of Potassium Biphthalate," *Materials Research*, (2005) vol. 8, No. 1. pp. 23-29.

Hartman et al., 2011, Deciding whether to go with the flow: evaluating the merits of flow reactors for synthesis, Angew Chem Int Ed., 50:7502-7519.

Helbig, W.A., "Activated Carbon," *Journal of Chemical Education*, Feb. 1946, pp. 98-102.

Henson et al., Aug. 1994, Adaptive nonlinear control of a PH neutralization process, IEEE Transactions on Control Systems Technology, 2(3):169-182.

Hewala et al., "Detection and determination of interfering 5-hydroxymethylfurfural in the analysis of caramel-coloured pharmaceutical syrups," *Journal of Clinical Pharmacy and Therapeutics*, (1993) 18:49-53.

Hughes et al., 2004, Array reactors for parallel synthesis, Journal of Combinatorial Chemistry, 6(3):308-311.

Ii et al., "Effect of renin inhibitor, ES-8891, on renal renin secretion and storage in the marmoset: comparison with captopril," *Journal of Hypertension*, 1991, vol. 9, No. 12, pp. 1119-1125.

Jacquet et al., 2004, Liquid chromatography analysis of monosubstituted sulfobutyl ether-β-cyclodextrin isomers on porous graphitic carbon, J. Sep. Sci. 27(14):1221-1228.

Jacquet et al., 2005, Characterization of a new methylated β-cyclodextrin with a low degree of substitution by matrix-assisted laser desorption/ionization mass spectrometry and liquid chromatography using evaporative light scattering detection, Journal of Chromatography A, 1083(1-2):106-112.

(56)          References Cited

OTHER PUBLICATIONS

Jindrich et al., 1995, Separation of cyclodextrins and their derivatives by thin-layer and preparative column chromatography, Carbohyd. Res., 275:1-7.

Johnson et al., "Solubilization of a Tripeptide HIV Protease Inhibitor Using a Combination of Ionization and Complexation with Chemically Modified Cyclodextrins," Journal of Pharmaceutical Sciences, vol. 83, No. 8, Aug. 1994, pp. 1142-1148.

Kageyama et al., "In Vitro Anti-Human Immunodeficiency Virus (HIV) Activities of Transition State Mimetic HIV Protease Inhibitors Containing Allophenylnorstatine," *Antimicrobial Agents and Chemotherapy*, Apr. 1993, vol. 37, No. 4, pp. 810-817.

Kauffman et al., "Zygomycosis: An Emerging Fungal Infection with New Options for Management," Invited Commentary, *Current Infectious Disease Reports*, 2007, 9(6):435-440.

Kim et al, Dec. 1998, Inclusion Complexation of Ziprasidone Mesylate with 8-Cyclodextrin Sulobutyl Ether, J. of Pharm. Sci., 87(12):1560-1567.

Kisselev et al., Proteasome inhibitors: from research tools to drug candidates, *Chemistry & Biology*, 8 (2001) pp. 739-758.

Kokubu et al., "An Orally Active Inhibitor of Human Renin, ES-8891," *Cardiovascular Drug Reviews*, © 1991 Neva Press, Branford, CT, vol. 9, No. 1, pp. 49-58.

Kokubu et al., "ES-8891, An Orally Active Inhibitor of Human Renin," *Hypertension*, © 1990, 15, pp. 909-913.

Kraus et al., 2002, Per(6-amino-2-O-carboxymethyl-6-deoxy-3-)-methyl)-alpha-cyclodextrin: helical self-assembly of a polyionic amino acid into nanotubes, Angew. Chem. Int. Ed., 41(10):1715-1717.

Kristinsson et al., 1996, Dexamethasone-cyclodextrin-polymer co-complexes in aqueous eye drops, Investigative Ophthalmology & Visual Science, 37(6):1199-1203.

Kuhn et al., "Potent activity of carfilzomib, a novel, irreversible inhibitor of the ubiquitin-proteasome pathway, against preclinical models of multiple myeloma," *Blood*, Nov. 1, 2007, vol. 110, No. 9, pp. 3281-3290.

Lammers et al., 1971, Properties of cyclodextrins: Part VI. Water-soluble cyclodextrin-derivatives. Preparation and Analysis, Die Starke, 23(5):167-171.

Lammers et al., 1972, Properties of cyclodextrins, Part VIII Determination of the composition of inclusion complexes of hexane and 2,3-dimethylbutane with cyclodextrin derivatives in aqueous solution, Recl. Trav. Chim. Pays-Bas, 91(6):733-753.

Lima et al., "β-Cyclodextrin Production by Simultaneous Fermentation and Cyclization," *Applied Biochemistry Biotechnology*, vol. 70-72 (1998) pp. 789-804.

Loftsson et al., 1994, The effect of polyvinylpyrrolidone and hydroxypropyl methylcellulose on HPβCD complexation of hydrocortisone and its permeability through hairless mouse skin, European Journal of Pharmaceutical Sciences, 2:297-301.

Loftsson et al., 1994, The effect of water-soluble polymers on drug-cyclodextrin complexation, International Journal of Pharmaceutics (Netherlands), 110(2):169-177.

Loftsson et al., 1996, Effects of cyclodextrins and polymers on topical drug delivery to the eye—evaluations in humans, Proceedings of the 23rd International Symposium on Controlled Release of Bioactive Materials, pp. 453-454.

Loftsson et al., 1996, The influence of water-soluble polymers and pH on hydroxypropyl-β-cyclodextrin complexation of drugs, Drug Development and Industrial Pharmacy, 22(5):401-405.

Loftsson et al., 1997, Cyclodextrins as pharmaceutical excipients, Pharm. Technol. Eur. 9(5):26-34.

Loftsson et al., 1997, Enhanced complexation efficiency of cyclodextrins, Pharmaceutical Research, 14(11):S203.

Loftsson et al., 1998, Cyclodextrin solubilization of ETH-615, a zwitterionic drug, Drug Development and Industrial Pharmacy, 24(4):365-370.

Loftsson et al., 1998, The effect of water-soluble polymers on the aqueous solubility and complexing abilities of β-cyclodextrin, International Journal of Pharmaceutics, 163(1-2):115-121.

Loftsson et al., 1999, Methods to enhance the complexation efficiency of cyclodextrins, S.T.P. Pharma Sciences, 9(3):237-242.

Loftsson et al., 2001, Cyclodextrin solubilization of benzodiazepines: formulation of midazolam nasal spray, International Journal of Pharmaceutics, 212(1):29-40.

Loftsson et al., 2005, Cyclodextrins in drug delivery, Expert Opinion on Drug Delivery, 2(2):335-351.

Loftsson et al., Apr. 11, 1994, The effect of hydroxypropyl methylcellulose on the release of dexamethasone from aqueous 2-hyroxypropyl-β-cyclodextrin formulations, International Journal of Pharmaceutics (Netherlands), 104:181-184.

Loftsson et al., Oct. 1994, Polymer-cyclodextrin-drug complexes, Pharmaceutical Research, 11(10):S225.

Loftsson et al., Oct. 1996, Pharmaceutical applications of cyclodextrins. 1. Drug solubilization and stabilization, Journal of Pharmaceutical Sciences, , 85(10):1017-1025.

Loftsson et al., Sep. 16, 1996, Drug-cyclodextrin-polymer ternary complexes, European Journal of Pharmaceutical Sciences, 4(Suppl):S144.

Loftsson et al., Sep. 1996, Solubilization of β-cyclodextrin, Eur. J. Pharm. Sci, 4(Suppl.):S143.

Loftsson et al., Sep. 2001, Sustained drug delivery system based on a cationic polymer and an anionic drug/cyclodextrin complex, Pharmazie, 56(9):746-747.

Loftsson, 1996, Topically effective acetazolamide eye-drop solution in man, Pharmaceutical Sciences, 2(6):277-279.

Loftsson, 1998, Drug-cyclodextrin complexation in the presence of water soluble polymers: enhanced solubility and percutaneous transport, Abstracts of Papers Part 1, 216th ACS National Meeting, Boston, Aug. 23-27, CELL-016.

Loftsson, Apr. 2-6, 1995, The effect of polymers on cyclodextrin complexation, Book of Abstracts, 209th ACS National Meeting, 209(1):33-CELL.

Loftsson, Nov. 1988, Increasing the cyclodextrin complexation of drugs and drug biovailability through addition of water-soluble polymers, Pharmazie, 53(11):733-740.

Lucas et al., "Adsorption isotherms for ethylacetate and furfural on activated carbon from supercritical carbon dioxide," *Fluid Phase Equilibria*, 219 (2004) pp. 171-179.

Luna et al., 1997, Fractionation and characterization of 4-sulfobutyl ether derivatives of cyclomaltoheptaose (β-cyclodextrin), Carbohydrate Research, 299:103-110.

Luna et al., 1997, Isolation and characterization by NMR spectroscopy of three monosubstituted 4-sulfobutyl ether derivatives of cyclomaltoheptose (β-cyclodextrin), Carbohydrate Research, 299(3):111-118.

Ma et al., 2016, The synthesis and process optimization of sulfobutyl ether β-cyclodextrin derivatives, Tetrahedron, 72:3105-3112.

Von Mach et al., "Accumulation of the solvent vehicle sulphobutylether beta cyclodextrin sodium in critically ill patients treated with intravenous voriconazole under renal replacement therapy" BMC Clinical Pharmacology vol. 6 No. 6 DOI:10.1186/1472-6904-6-6 (Year: 2006).

Malaekeh-Nikouei et al., 2009, Evaluation the effect of cyclodextrin complexation on aqueous solubility of fluorometholone to achieve ophthalmic solution, J Incl Phemon Macrocycl Chem, 65(3-4):335-340.

Marshall et al., "Flax Shive as a Source of Activated Carbon for Metals Remediation," *BioResources*, (2007) 2(1), pp. 82-90.

Masson et al., 1999, Drug-cyclodextrin complexation in the presence of water-soluble polymers: enhanced solubility and percutaneous transport, ACS Symposium Series, 737 (Polysaccharide Applications), pp. 24-45.

McDougall, G.J., "The physical nature and manufacture of activated carbon," *Journal of the South African Institute of Mining and Metallurgy*, Apr. 1991, vol. 91, No. 4, pp. 109-120.

McQuade, D. Tyler et al., Applying Flow Chemistry: Methods, Materials, and Multistep Synthesis, The Journal of Organic Chemistry, Jun. 10, 2013, p. 6384-6389, vol. 78, ACS Publications.

Meng et al., "Eponemycin Exerts Its Antitumor Effect through the Inhibition of Proteasome Function," *Cancer Research*, Jun. 15, 1999, 59, pp. 2798-2801.

(56) References Cited

OTHER PUBLICATIONS

Merck & Co., Inc., Nov. 2015, Noxafil, Highlighs of prescribing information, Reference ID: 3847805, 39 pp.

Mettler-Toledo AG, Process Analytics, Inc., Aug. 27, 2009, Reliable measurements in a continuous flow baffled reactor, Pharmaceutical Online, 1 p.

Modified Cyclodextrins: Scaffolds and Templates for Supramolecular Chemistry, Easton et al. eds., Imperial College Press, London, UK, 1999.

Molina-Sabio et al., "Porosity in Granular Carbons Activated With Phosphoric Acid," *Carbon*, © 1994, vol. 33, No. 8, pp. 1105-1113.

Mosher et al., "Sulfobutylether β-Cyclodextrin," *Handbook of Pharmaceutical Excipients*, Fifth Edition Pharmaceutical Press, Edited by Rowe et al., © 2006, pp. 754-757.

Mosher et al., 2001, Complexation and Cyclodextrins, in Encyclopedia of Pharmaceutical Technology, Swarbrick et al., eds., Marcel Dekker, Inc., New York, pp. 49-71.

Murney, Peter, "To mix or not to mix—compatibilities of parenteral drug solutions," *Australian Prescriber*, vol. 31, No. 4, Aug. 2008, pp. 98-101.

Murty et al., "Quality control and drug analysis," *Am J Hosp Pharma*, Feb. 1977, vol. 34, No. 2, pp. 205-206.

Namasivayam et al., "Equilibrium and kinetic studies of adsorption of phosphate onto $ZnCl_2$ activated coir pith carbon," *Journal of Colloid and Interface Science*, 280 (2004) pp. 359-365.

Neunert et al., 2009, Glycosidic moiety changes the spectroscopic properties of DL-α-tocopherol in DMSO/water solution and in organic solvents, Molecular and biomolecular spectroscopy, Spectrochimica Acta Part A, 73:301-308.

New Trends in Cyclodextrins and Derivatives, Duchene ed., Editions de Sante, Parks, France, 1991.

Norit Americas Inc., Jul. 2007, DARCO® KB-G Powdered Activated Carbon Product Datasheet, 2 pp.

Peeters et al., "Characterization of the Interaction of 2-Hydroxypropyl-β-cyclodextrin with Itraconazole at pH 2, 4, and 7," *Journal of Pharmaceutical Sciences*, vol. 91, No. 6, Jun. 2002, pp. 1414-1422.

Penry et al., May 1986, Chemical reactor analysis and optimal digestion: an optimal digestion theory can be readily derived from basic principles of chemical reactor analysis and design, BioScience, 35(5):310-315.

Petrikkos et al., "Recent advances in antifungal chemotherapy," *International Journal of Antimicrobial Agents*, 30 (2007) pp. 108-117.

Pfizer, Jun. 2010, VFEND® I.V. (voriconzaole) for injection, VFEND® Tablets (voriconazole, VFEND® (voriconazole) for oral suspension, product information, Reference IDL 2866932, 51 pp.

Pitha, "Amorphous Water-Soluble Derivatives of Cyclodextrins: from Test Tube to Patient," *Advances in Drug Delivery Systems*, 3, Third International Symposium on Recent Advances in Drug Delivery Systems, Feb. 24-27, 1987, Salt Lake City, UT, © Elsevier Science Publishers B.V., 1987, pp. 309-313.

Polymer Science, in Physical Pharmacy. Physical Chemical Principles in Pharmaceutical Sciences, 3rd edition, Martin et al., 1983, pp. 592-638.

Polymers and Macromolecules, in Physicochemical Principles of Pharmacy, 2nd edition, Florence et al., eds. pp. 281-334, 1988.

Qu et al., 2002, Sulfoalkyl ether B-cyclodextrin derivatives: synthesis and characterizations, J. Inclusion Phenom. Macro. Chem, 43:213-221.

Rajewski 1990, Development and evaluation of the usefulness and parenteral safety of modified cyclodextrins, Doctoral Dissertation, University of Kansas, 257 pp.

Rajewski et al., "Pharmaceutical Applications of Cyclodextrins. 2. In Vivo Drug Delivery," *Journal of Pharmaceutical Sciences*, vol. 85, No. 11, Nov. 1996, pp. 1142-1169.

Ran et al., "Solubilization and Preformulation Studies on PG-300995 (an Anti-HIV Drug)" Journal of Pharmaceutical Sciences vol. 94 No. 2 pp. 297-303 DOI 10.1002/jps.20246 (Year: 2005).

Remington, "Instrumental Methods of Analysis," *Remington's Pharmaceutical Sciences*, Chapter 34, 17th Ed. (1985) pp. 623-624.

Remington's Pharmaceutical Sciences, 18th Edition, Gennaro ed., 1990, Hydrophilic Dispersions, pp. 436-437.

Remington's Pharmaceutical Sciences, 18th Edition, Gennaro ed., 1990, Hydrophilic Dispersions, pp. 291-294.

Sacco et al., 2011, Carfilzomib-dependent selective inhibition of the chymotrypsin-like activity of the proteasome leads to anti-tumor activity in Waldstrom's macroglobulinemia, Clinical Cancer Research, 17(7):1753-64.

Sandarusi et al., 1988, An automated flow calorimeter for heat capacity and enthalpy measurements, International Journal of Thermophysics, 9(6):993-1002.

Sanderink et al., "Human Aminopeptidases: A Review of the Literature," *J. Clin. Chem. Clin. Biochem.*, vol. 26, No. 12 (1988) pp. 795-807.

Savage et al., 2015, Continuous tank reactor synthesis of highly substituted sulphobutylether β-cyclodextrins, International Journal of Pharmaceutics, 495:862-868.

Savolainen et al., 1998, Co-administration of a water-soluble polymer increases the usefulness of cyclodextrins in solid oral dosage forms, Pharmaceutical Research, 15(11):1696-1701.

Savolainen et al., May 31-Jun. 3, 1998, Coadministration of a water-soluble polymer increases the usefulness of cyclodextrins in solid oral dosage forms, 9th Proceedings of the International Symposium on Cyclodextrins, Santiago de Comostela, Spain, eds. Labandeira et al., pp. 261-264.

Scaman, Christine, "Spectroscopy Basics," in *Handbook of Food Science, Technology and Engineering*, © 2005 by Taylor & Francis Group, LLC, vol. 1, Chap. 43, pp. 43-1-43-23.

Schmitt et al., 2004, Chiral capillary electrophoresis: facts and fiction on the reproducibility of resolution with randomly substituted cyclodextrins, Electrophoresis, 25(16):2801-2807.

Sebestyen et al., 2013, Pharmaceutical applications of sulfobuthyleter-β-cyclodestrin, Acta Pharmaceutica Hungarica 83:57-68.

SEC Form 10-K as of Dec. 31, 2009 by Onyx Pharmaceuticals Inc. at Exhibit 10.22.

Shklyarev et al., "Synthesis, Acute Toxicity, and Antiarrhythmic Activity of Orthosubstituted Arylamides of Morpholinoacetic Acid," Translated from *Khimiko-farmatsevticheskii Zhurnal*, vol. 26, No. 3, Mar. 1992, © 1992 Plenum Publishing Corporation, pp. 235-238.

Sigurdardottir et al., Dec. 29, 1995, The effect of polyvinylpyrrolidone on cyclodextrin complexation of hydrocortisone and its diffusion through hairless mouse skin, International Journal of Pharmaceutics (Netherlands), 126:73-78.

Sokoloski, Theodore D., "Solutions and Phase Equilibria," *Remington's Pharmaceutical Sciences*, 17th Edition, 1985, Alfonso R. Gennaro, Editor, Mack Publishing Co., Chapter 16., pp. 207-229.

Sotthivirat et al., 2007, Evaluation of various properties of alternative salt forms of sulfobutylether-β-cyclodextrin, $(SBE)_{7M}$-β-CD, Int. J. Pharm. 330:73-81.

Sporanox® (itraconazole) Injection, Marketing Tech Info, Manufactured for: Ortho Biotech Products,L.P, Raritan, NJ 08869; Manufactured by: Hospira, Inc., Lake Forest, IL 60045, Revised Mar. 2009, 28 pages.

Stella et al., 2008, Cyclodextrins, Toxicologic Pathology, 36:30-42.

Stella, Mar. 31-Apr. 2, 1996, SBE7-β-CD, a new, novel and safe polyanionic β-cyclodextrin derivative: characterization and biomedical applications, Proceedings of the Eighth International Symposium on Cyclodextrins, Budapest, Hungary, pp. 471-476.

Strickley et al., Feb. 2004, Solubilizing excipients in oral and injectable formulations, Pharmaceutical Research, 21(2):201-230.

Sugawara et al., "Eponemycin†, A New Antibiotic Active Against B16 Melanoma, I. Production, Isolation, Structure and Biological Activity," *The Journal of Antibiotics*, Jan. 1990, vol. XLIII, No. 1, pp. 8-18.

Szejtli, József, "Introduction and General Overview of Cyclodextrin Chemistry," *Chemical Reviews*, 1998, vol. 98, No. 5, pp. 1743-1753.

Szeman et al., 2006, Novel stationary phases for high-performance liquid chromatography analysis of cyclodextrin derivatives, Journal of Chromatography, 1116:76-82.

Szeman et al., 2012, Characterization of randomly substitute anionic cyclodextrin derivatives with different analytical methods, 16th International Cyclodextrin Symposium, Tianjin, China, poster, 2 pp.

(56)        References Cited

OTHER PUBLICATIONS

Szente et al., 1999, Highly soluble cyclodextrin derivatives: chemistry, properties, and trends in development, Advanced Drug Delivery Reviews 36:17-28.

Tait et al., 1992, Characterization of sulphoalkyl ether derivatives of β-cyclodextrin by capillary electrophoresis with indirect UV detection, Journal of Pharmaceutical & Biomedical Analysis, 10(9):615-622.

Tarver et al., 2002, 2-O-substituted cyclodextrins as reversal agents for the neuromuscular blocker rocuronium bromide, Bioorganic & Medicinal Chemistry, 10:1819-1827.

The Handbook of Pharmaceutical Excipients, 5th Ed., Rowe et al., eds., The Pharmaceutical Press and American Pharmacists Association, London, UK and Washington, DC (2006).

Thermo Scientific, 2014, pH Measurement Handbook, pp. 1-30.

Third European Congress of Pharmaceutical Sciences, Edinburgh, Scotland, UK, Sep. 15-17, 1996.

Thompson, Diane O., "Cyclodextrins-Enabling Excipients: A Case Study of the Development of a New Excipient—Sulfobutylether β-Cyclodextrin (CAPTISOL®)," Chapt. 5, 51-67, *Excipient Development for Pharmaceutical, Biotechnology, and Drug Delivery Systems*, Edited by Katdare et al., © 2006 by Informa Healthcare USA, Inc., Chapter 5, pp. 51-67.

Thompson, Diane O., "Cyclodextrins-Enabling Excipients: Their Present and Future Use in Pharmaceuticals," *Critical Reviews™ in Therpeutic Drug Carrier Systems*, vol. 14, Issue 1 (1997) pp. 1-104.

Tongiani et al., 2005, Sulfoalkyl ether-alkyl ether-cyclodextrin derivatives, their synthesis, NMR characterization, and binding of 6α-methylprednisolone, J. Pharm. Sci., 94(11):2380-2392.

Trotta et al., 2000, Thermal degradation of cyclodextrins, Polymer Degradation and Stability, 69:373-379.

U.S. Department of Health and Human Services, Food and Drug Administration, Jul. 2006, Guidance for industry: Q3B(R2) impurities in new drug products, 18 pp.

USP 24, Official Monographs, "Cetylpyridinium Chloride," *The United States Pharmacopeia, The National Formulary*, Official from Jan. 1, 2000, pp. 370-373.

Vegvari et al., 2000, A new easy-to-prepare continuous electrochromatographic bed for enantiomer recognition, Electrophoresis, 21:3116-3125.

Walsh et al., 2000, New targets and delivery systems for antifungal therapy, Medical Mycology, 38(Supple 1):335-347.

Wang et al., 2004, Bioavailability and anticataract effects of a topical ocular drug, Curr. Eye Res., 29(1):51-58.

Waterman et al., "Impurities in Drug Products," *Handbook of Isolation and Characterization of Impurities in Pharmaceuticals*, Academic Press, © 2003 Elsevier Science, Edited by Ahuja et al., Chapter 4, pp. 75-88.

Weatherhead et al., "Some Effects of Activated Charcoal as an Additive to Plant Tissue Culture Media," *Z. Pflanzenphysiol. Bd. 89.* S. (1978) pp. 141-147.

Welch et al., 2008, Microscale HPLC predicts preparative performance at millionfold scace, Org. Proc. Res. Dev., 12:674-677.

Wenz et al., 1999, Synthesis of highly water-soluble cyclodextrin sulfonates by addition of hydrogen sulfite to cyclodextrin allyl ethers, Carbohydr. Res. 322:153-165.

Wittung et al., 1994, Absorption flattening in the optical spectra of liposome-entrapped substances, FEBS Letters 352:37-40.

Yang et al., 2011, Pharmacokinetics, pharmacodynamics, metabolism, distribution, and excretion of carfilzomib in rats, Drug Metabolism and Distribution, 39(10):1873-1882.

Yang et al., 2013, Study of the synthesis technology of sulfobutyl ether β-cyclodextrins with different of substitution, in Chemical World, pp. 110-113.

Zannou et al., 2001, Osmotic properties of sulfobutylether and hydroxypropyl cyclodextrins, Pharmaceutical Research 18(8):1226-1231.

Zia et al., 1997, Effect of alkyl chain length and degree of substitution on the complexation of sulfoalkyl ether β-cyclodextrins with steroids, Journal of Pharmaceutical Sciences, 86(2):220-224.

Zia et al., 2000, Thermodynamics of binding of neutral molecules to sulfobutyl ether β-cyclodextrins (SBE-β-CDs): the effect of total degree of substitution, Pharmaceutical Research 17(8):936-941.

International Search Report and Written Opinion dated Dec. 7, 2021 for application No. PCT/US2021/051825.

Mosher et al., 2009, Sulfobutylether β-Cyclodextrin, *Handbook of Pharmaceutical Excipients, Sixth Edition*, Pharmaceutical Press, Edited by Rowe et al., pp. 714-717.

* cited by examiner

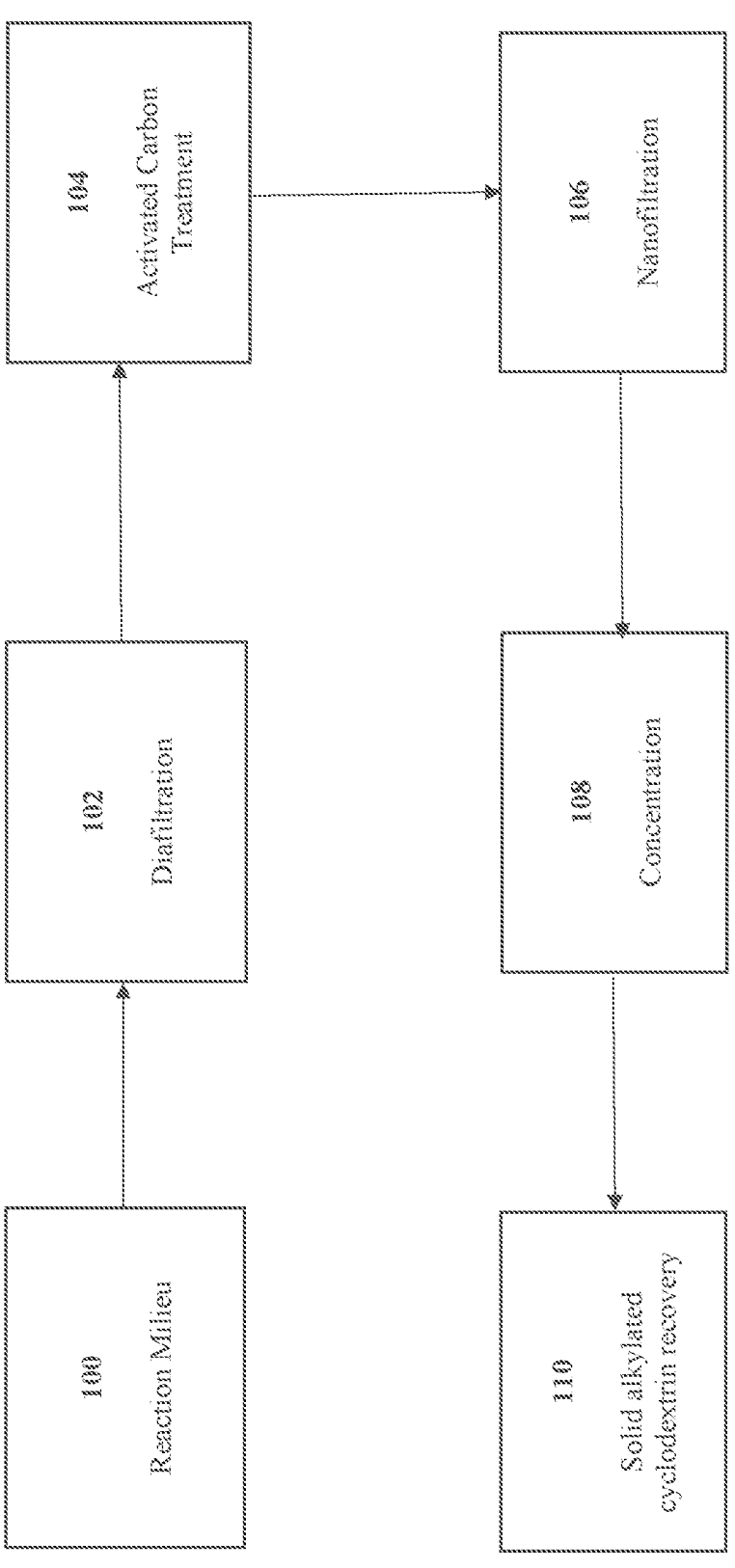

ALKYLATED CYCLODEXTRIN COMPOSITIONS AND PROCESSES FOR PREPARING AND USING THE SAME

BACKGROUND

Field

The present disclosure relates to processes for efficient, large-scale preparation of high purity alkylated cyclodextrins, compositions comprising alkylated cyclodextrins, and methods of using the same.

Description of the Related Art

Hydrophobic, hydrophilic, polymerized, ionized, non-ionized and many other derivatives of cyclodextrins have been developed, and their use in various industries has been established. Generally, cyclodextrin derivatization proceeds via reactions in which —OH groups at the 2-, 3-, and/or 6-position of the amylose rings of a cyclodextrin are replaced with substituent groups. Substituents include neutral, anionic and/or cationic functional groups.

Known cyclodextrin derivatives such as alkylated cyclodextrins include, but are not limited to, sulfoalkyl ether cyclodextrins, alkyl ether cyclodextrins (e.g., methyl, ethyl and propyl ether cyclodextrins), hydroxyalkyl cyclodextrins, thioalkyl ether cyclodextrins, carboxylated cyclodextrins (e.g., succinyl-β-cyclodextrin, and the like), sulfated cyclodextrins, and the like. Alkylated cyclodextrins having more than one type of functional group are also known, such as sulfoalkyl ether-alkyl ether-cyclodextrins (see, e.g., WO 2005/042584 and US 2009/0012042, each of which is hereby incorporated by reference in its entirety). In particular, alkylated cyclodextrins having 2-hydroxypropyl groups and/or sulfoalkyl ether groups have found use in pharmaceutical formulations.

A sulfobutyl ether derivative of β-cyclodextrin ("SBE-β-CD") has been commercialized by CyDex Pharmaceuticals, Inc. as CAPTISOL®. The anionic sulfobutyl ether substituent improves the aqueous solubility and safety of the parent β-cyclodextrin, which can reversibly form complexes with active pharmaceutical agents, thereby increasing the solubility of active pharmaceutical agents and, in some cases, increase the stability of active pharmaceutical agents in aqueous solution. CAPTISOL® has a chemical structure according to Formula X:

X where R is —H or —(CH$_2$)$_4$—SO$_3$$^-$Na$^+$, and the average degree of substitution with —(CH$_2$)$_4$—SO$_3$$^-$Na$^+$ is from 6 to 7.1.

Sulfoalkyl ether derivatized cyclodextrins (such as CAPTISOL®) are prepared using batch methods as described in, e.g., U.S. Pat. Nos. 5,134,127, 5,376,645 and 6,153,746, each of which is hereby incorporated by reference in its entirety.

Sulfoalkyl ether cyclodextrins and other derivatized cyclodextrins can also be prepared according to the methods described in the following patents and published patent applications: U.S. Pat. Nos. 3,426,011; 3,453,257; 3,453,259; 3,459,731; 4,638,058; 4,727,064; 5,019,562; 5,173,481; 5,183,809; 5,241,059; 5,536,826; 5,594,125; 5,658,894; 5,710,268; 5,756,484; 5,760,015; 5,846,954; 6,407,079; 7,625,878; 7,629,331; 7,635,773; US2009/0012042; JP 05001102; and WO 01/40316; as well as in the following non-patent publications: Lammers et al., *Recl. Trav. Chim. Pays-Bas* 91:733 (1972); *Staerke* 23:167 (1971); Adam et al., *J. Med. Chem.* 45:1806 (2002); Qu et al., *J. Inclusion Phenom. Macrocyclic Chem.* 43:213 (2002); Tarver et al., *Bioorg. Med. Chem.* 10:1819 (2002); Fromming et al., *Cyclodextrins in Pharmacy* (Kluwer Academic Publishing, Dordrecht, 1994); *Modified Cyclodextrins: Scaffolds and Templates for Supramolecular Chemistry* (C. J. Easton et al. eds., Imperial College Press, London, U K, 1999); *New Trends in Cyclodextrins and Derivatives* (Dominique Duchene ed., Editions de Santé, Paris, F R, 1991); *Comprehensive Supramolecular Chemistry* 3 (Elsevier Science Inc., Tarrytown, NY); the entire disclosures of which are hereby incorporated by reference.

Impurities present in an alkylated cyclodextrin composition can reduce the shelf-life and potency of an active agent composition. Impurities can be removed from an alkylated cyclodextrin composition by exposure to (e.g., mixing with) activated carbon. Methods for increasing the purity of alkylated cyclodextrins are described in U.S. Pat. Nos. 7,635,773, 9,493,582, and 10,040,872, the disclosure of each of which are hereby incorporated by reference in its entirety.

As the use of alkylated cyclodextrins in pharmaceutical applications grows in importance, a need exists for efficient, large-scale processes for making alkylated cyclodextrins with suitable purity for pharmaceutical use.

SUMMARY

The present disclosure provides a process for preparing an alkylated cyclodextrin composition, the process comprising: (a) mixing a cyclodextrin with an alkylating agent to form a reaction milieu comprising an alkylated cyclodextrin; (b) conducting a first one or more separations to form a first solution comprising the alkylated cyclodextrin, wherein the one of more separations comprises diafiltration through an ultrafiltration membrane; (c) treating the first solution with an activated carbon to produce a second alkylated cyclodextrin solution; and (d) conducting a second one or more separations to form a third alkylated cyclodextrin solution, wherein the one or more separations comprises nanofiltration through a nanofiltration membrane.

In some embodiments, solvent may be added to dilute the reaction milieu formed in step (a) prior to conducting the first one or more separations. In some specific embodiments, the solvent is water. In some embodiments, the concentration of the alkylated cyclodextrin in step (b) is less than 10% (w/w) prior to the first one or more separations. In some embodiments, the concentration of the alkylated cyclodextrin in step (b) is less than 8% (w/w) prior to the first one or more separations. In some embodiments, the concentration of the alkylated cyclodextrin in step (b) is less than 6% (w/w) prior to the first one or more separations. In some embodiments, the concentration of the alkylated cyclodextrin in step (b) is from about 3% (w/w) to about 8% (w/w) or from about 4% (w/w) to about 6% (w/w) prior to the first one or more separations.

In some embodiments, the ultrafiltration membrane in step (b) has a molecular weight cut-off (MWCO) of about 1000 Da or lower. In some embodiments, the ultrafiltration membrane in step (b) has a MWCO of about 1000 Da. In other embodiments, the ultrafiltration membrane in step (b) has a MWCO of about 650 Da. In yet other embodiments, the ultrafiltration membrane in step (b) has a MWCO of about 500 Da. In some embodiments, the ultrafiltration membrane in step (b) has a MWCO of about 500 to about 1000 Da.

In some embodiments, the activated carbon may be prepared by a method comprising the step of subjecting the activated carbon to an initial carbon washing process comprising adding a portion of the first solution comprising the alkylated cyclodextrin from step (b) to the carbon, soaking the carbon in the first solution, and eluting and discarding the solution.

In some embodiments, the activated carbon may be further subjected to a washing process comprising flowing water over the carbon after the initial carbon washing process and eluting the water. In some embodiments, the water is flowed over the carbon for at least 30 minutes. In other embodiments, the water is flowed over the carbon for at least two hours. In some embodiments, the eluted wash water has a residual conductivity of 10 µS/cm or less In some embodiments, the activated carbon is phosphate free. In some embodiments, the activated carbon is steam activated. In other embodiments, the activated carbon is acid activated with, e.g., phosphoric acid. In yet other embodiments, the activated carbon is activated with zinc chloride. In some embodiments, the activated carbon is granular.

In some embodiments, the concentration of the alkylated cyclodextrin in the second alkylated cyclodextrin solution introduced into step (d) is from about 3% (w/w) to about 8% (w/w). In some embodiments, the concentration of the alkylated cyclodextrin in the second alkylated cyclodextrin solution introduced into step (d) is from about 4% (w/w) to about 7% (w/w). In some embodiments, the concentration of the alkylated cyclodextrin in the second alkylated cyclodextrin solution introduced into step (d) is about 5% (w/w).

In some embodiments, the nanofiltration membrane in step (d) has a MWCO of about 500 Da or lower. In some embodiments, wherein the nanofiltration membrane has a MWCO of about 500 Da. In other embodiments, the nanofiltration membrane has a MWCO of about 400 Da. In some embodiments, the nanofiltration membrane has a MWCO of about 300 Da. In some embodiments, the nanofiltration membrane has a MWCO of about 200 Da. In some embodiments, the nanofiltration membrane has a MWCO of about 150 Da. In some embodiments, the nanofiltration membrane has a MWCO of about 150-500 Da. In some embodiments, the nanofiltration membrane has a MWCO of about 300-500 Da.

In some embodiments, the nanofiltration is conducted for a period of 30 minutes to 12 hours. In some embodiments, the nanofiltration is conducted for a period of about 1 hour to about 3 hours. In some embodiments, the nanofiltration is conducted for a period of 2 hours. In some embodiments, the nanofiltration is conducted for a period of 3 hours.

In some embodiments, the concentration of the alkylated cyclodextrin in the third alkylated cyclodextrin solution is from about 10% (w/w) to about 25% (w/w). In some embodiments, the concentration of the alkylated cyclodextrin in the third alkylated cyclodextrin solution is from about 15% (w/w) to about 20% (w/w). In some embodiments, the concentration of the alkylated cyclodextrin in the third alkylated cyclodextrin solution is about 18% (w/w) to about 20% (w/w).

In some embodiments, the third alkylated cyclodextrin solution (i.e., the solution formed after conducting a second one or more separations, wherein the one or more separations comprises nanofiltration through a nanofiltration membrane) may be concentrated for a period of about 2 hours to about 24 hours to form a fourth alkylated cyclodextrin solution. In some embodiments, the third alkylated cyclodextrin solution may be concentrated for a period of about 6 hours to about 18 hours to form a fourth alkylated cyclodextrin solution. In some embodiments, the third alkylated cyclodextrin solution may be concentrated for a period of about 8 hours to about 12 hours to form a fourth alkylated cyclodextrin solution. In some embodiments, the third alkylated cyclodextrin solution may be concentrated for a period of about 9 hours to form a fourth alkylated cyclodextrin solution. In some embodiments, concentrating the third alkylated cyclodextrin solution is performed by distillation.

In some embodiments, the concentration of the alkylated cyclodextrin in the fourth alkylated cyclodextrin solution is from about 30% (w/w) to about 70% (w/w). In some embodiments, the concentration of the alkylated cyclodextrin in the fourth alkylated cyclodextrin solution is from about 40% (w/w) to about 60% (w/w). In some embodiments, the concentration of the alkylated cyclodextrin in the fourth alkylated cyclodextrin solution is about 50% (w/w).

In some embodiments, the process disclosed herein further comprising removing some or all of the solvent from the fourth alkylated cyclodextrin solution to form a solid alkylated cyclodextrin. In some embodiments, solvent is removed by distillation, lyophilization, or spray-drying.

In some embodiments, the solid alkylated cyclodextrin formed by the processes described herein comprises less than 500 ppm of a phosphate. In some embodiments, the solid alkylated cyclodextrin comprises less than 125 ppm of a phosphate. In some embodiments, the solid alkylated cyclodextrin comprises less than 0.05% (w/w) of a chloride. In some embodiments, the solid alkylated cyclodextrin comprises less than 0.01% (w/w) of a chloride. In some embodiments, the solid alkylated cyclodextrin comprises less than 0.002% (w/w) of a chloride.

In some embodiments, the processes described herein comprise preparing a single batch of alkylated cyclodextrin wherein the starting cyclodextrin has a mass greater than 275 kg. In other embodiments, the processes described herein comprise preparing a single batch of alkylated cyclodextrin wherein the starting cyclodextrin has a mass greater than 300 kg. In yet other embodiments, the processes described herein comprise preparing a single batch of alkylated cyclodextrin wherein the starting cyclodextrin has a mass greater than 350 kg.

In some embodiments, the alkylated cyclodextrin has an average degree of substitution of 2 to 9. In some embodiments the alkylated cyclodextrin has an average degree of substitution of 4.5 to 7.5. In some embodiments, the alkylated cyclodextrin has an average degree of substitution of 6 to 7.5.

In some embodiments, the alkylated cyclodextrin prepared by the processes disclosed herein is a sulfoalkyl ether cyclodextrin of Formula (II):

Formula (II)

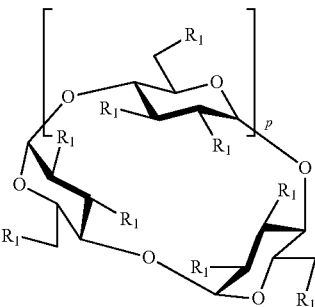

wherein p is 4, 5, or 6, and $R_1$ is independently selected at each occurrence from —OH or —O—$(C_2$-$C_6$ alkylene)-$SO_3^-$-T, wherein T is independently selected at each occurrence from pharmaceutically acceptable cations, provided that at least one $R_1$ is —OH and at least one $R_1$ is O—$(C_2$-$C_6$ alkylene)-$SO_3^-$-T.

In some embodiments, $R_1$ is independently selected at each occurrence from —OH or —O—$(C_4$ alkylene)-$SO_3^-$-T, and -T is $Na^+$ at each occurrence.

In some embodiments, the processes described herein may further comprise combining the solid alkylated cyclodextrin with one or more excipients. In some embodiments, the processes described herein may further comprise combining the solid alkylated cyclodextrin with an active agent.

Further embodiments, features, and advantages of the present disclosure, as well as the composition, structure, and operation of various embodiments of the present disclosure, are described in detail below with reference to the accompanying drawings.

BRIEF DESCRIPTION OF THE DRAWINGS

FIG. 1 shows a schematic representation of a purification process for the alkylated cyclodextrin preparation described herein.

DETAILED DESCRIPTION

As used herein, percentages refer to "% by weight" and/or "w/w" (weight by weight concentration) unless otherwise indicated.

References to spatial descriptions (e.g., "above," "below," "up," "down," "top," "bottom," etc.) made herein are for purposes of description and illustration only, and should be interpreted as non-limiting upon the processes, equipment, compositions and products of any method of the present disclosure, which can be spatially arranged in any orientation or manner.

Alkylated Cyclodextrin

An "alkylated cyclodextrin composition" is a composition comprising alkylated cyclodextrins having a degree of substitution or an average degree of substitution (ADS) for a specified substituent. An alkylated cyclodextrin composition comprises a distribution of alkylated cyclodextrin species differing in the individual degree of substitution specified substituent for each species, wherein the specified substituent for each species is the same. As used herein, an "alkylated cyclodextrin composition" is composition which does not contain separate or second substance as a pharmaceutically active agent). For example, a cyclodextrin composition may comprise at least 90% (w/w) cyclodextrin, at least 95% (w/w) cyclodextrin, at least 97% (w/w) cyclodextrin, at least 99% (w/w) cyclodextrin, at least 99.9% (w/w) cyclodextrin, or at least 99.99% (w/w) cyclodextrin.

The alkylated cyclodextrin can be a water soluble alkylated cyclodextrin, which is any alkylated cyclodextrin exhibiting enhanced water solubility over its corresponding underivatized parent cyclodextrin and having a molecular structure based upon α-, β- or γ-cyclodextrin. In some embodiments, a derivatized cyclodextrin prepared by a process of the present disclosure has a solubility in water of 100 mg/mL or higher, or a solubility in water of less than 100 mg/mL.

The cyclodextrin can be derivatized with neutral, anionic or cationic substituents at the C2, C3, or C6 positions of the individual saccharides forming the cyclodextrin ring. Suitable water soluble alkylated cyclodextrins are described herein. The alkylated cyclodextrin can also be a water insoluble alkylated cyclodextrin or a alkylated cyclodextrin possessing a lower water solubility than its corresponding underivatized parent cyclodextrin.

As used herein, a "substituent precursor" or "alkylating agent" refers to a compound, reagent, moiety, or substance capable of reacting with an —OH group present on a cyclodextrin. In some embodiments, the derivatized cyclodextrin includes a substituent such as a sulfoalkyl ether group, an ether group, an alkyl ether group, an alkenyl ether group, a hydroxyalkyl ether group, a hydroxyalkenyl ether group, a thioalkyl ether group, an aminoalkyl ether group, a mercapto group, an amino group, an alkylamino group, a carboxyl group, an ester group, a nitro group, a halo group, an aldehyde group, a 2,3-epoxypropyl group, and combinations thereof. In some embodiments, alkylating agents include an alkyl sultone (e.g., 1,4-butane sultone, 1,5-pentane sultone, 1,3-propane sultone, and the like). An alkylated cyclodextrin is a cyclodextrin in which one or more —OH groups is replaced with an —O—R group, wherein the R contains an alkyl moiety. For example, the —O—R group can be an alkyl ether or a sulfoalkyl ether.

After reaction, purification, and/or isolation, the alkylated cyclodextrin of the present disclosure can comprise small amounts (e.g., 1% or less, 0.5% or less, 0.1% or less, 0.05% or less, 0.001% or less, 0.0005% or less, or 0.0001% or less, by weight) of a cyclodextrin starting material (e.g., an underivatized parent cyclodextrin).

The alkylated cyclodextrin can be present in high purity form. See U.S. Pat. Nos. 7,635,773; 9,493,582; and 10,040, 872, the disclosure of each of which are hereby incorporated by reference in its entirety. In some embodiments, the alkylated cyclodextrin is a high purity SAE-CD composition having a reduced amount of drug-degrading agent. The alkylated cyclodextrin optionally has a reduced amount of phosphate or excludes phosphate entirely. The alkylated cyclodextrin also optionally has low amounts of a color-forming agent. The SAE-CD can also have reduced amounts of 1,4-butane sultone and 4-hydroxy-butane-1-sulfonic acid. The SAE-CD can also have reduced amounts of chloride.

An alkylated cyclodextrin of the present disclosure provides unexpected advantages over other structurally related alkylated cyclodextrins. By "structurally related" is meant, for example, that the substituent of the alkylated cyclodextrin in the composition is essentially the same as the substituent of the other alkylated cyclodextrin to which it is being compared. Exemplary advantages can include an enhanced purity, reduced content of pyrogens, reduced content of drug-degrading components, reduced content of color-forming agents, reduced content of unreacted substituent precursor, and/or reduced content of unreacted cyclodextrin starting material. An exemplary advantage also includes a reduced chloride content and/or a reduced phosphate content.

A water soluble alkylated cyclodextrin composition can comprise a sulfoalkyl ether cyclodextrin (SAE-CD) compound, or mixture of compounds, of the Formula I:

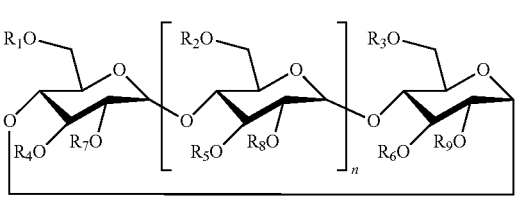

I wherein: n is 4, 5 or 6; wherein $R_1$, $R_2$, $R_3$, $R_4$, $R_5$, $R_6$, $R_7$, $R_8$ and $R_9$ are independently —H, a straight-chain or branched $C_1$-$C_8$-(alkylene)-$SO_3^-$ group, or an optionally substituted straight-chain or branched $C_1$-$C_6$ group; wherein at least one of $R_1$, $R_2$, $R_3$, $R_4$, $R_5$, $R_6$, $R_7$, $R_8$ and $R_9$ is a straight-chain or branched $C_1$-$C_8$-(alkylene)-$SO_3^-$ group.

In some embodiments, the SAE-CD is a water-soluble alkylated cyclodextrin of Formula II:

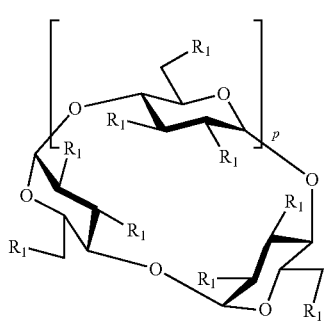

II wherein: p is 4, 5 or 6;
    $R_1$ is independently selected at each occurrence from —OH or -SAE-T;
    -SAE- is a —O—($C_2$-$C_6$ alkylene)-$SO_3^-$ group, wherein at least one SAE is independently a —O—($C_2$-$C_6$ alkylene)-$SO_3^-$ group, a —O—$(CH_2)_g SO_3^-$ group, wherein g is 2 to 6, or 2 to 4, (e.g. —$OCH_2CH_2CH_2SO_3^-$ or —$OCH_2CH_2CH_2CH_2SO_3^-$); and -T is independently selected at each occurrence from the group consisting of pharmaceutically acceptable cations, which group includes, for example, $H^+$, alkali metals (e.g., $Li^+$, $Na^+$, $K^+$), alkaline earth metals (e.g., $Ca^{+2}$, $Mg^{+2}$), ammonium ions and amine cations such as the cations of ($C_1$-$C_6$)-alkylamines, piperidine, pyrazine, ($C_1$-$C_6$)-alkanolamine, ethylenediamine and ($C_4$-$C_8$)-cycloalkanolamine among others; provided that at least one $R_1$ is a hydroxyl moiety and at least one $R_1$ is -SAE-T.

In some embodiments, T may be associated with an ion exchange resin, poly-L-lysine, polycationic chitosan, or any combination thereof.

When at least one $R_1$ of a derivatized cyclodextrin molecule is -SAE-T, the degree of substitution, in terms of the -SAE-T moiety, is understood to be at least one (1). When the term -SAE- is used to denote a sulfoalkyl-(alkylsulfonic acid)-ether moiety it being understood that the -SAE- moiety comprises a cation (-T) unless otherwise specified. Accordingly, the terms "SAE" and "—SAE-T" can, as appropriate, be used interchangeably herein.

Since SAE-CD is a poly-anionic cyclodextrin, it can be provided in different salt forms. Suitable counterions include cationic organic atoms or molecules and cationic inorganic atoms or molecules. The SAE-CD can include a single type of counterion or a mixture of different counterions. The properties of the SAE-CD can be modified by changing the identity of the counterion present. For example, a first salt form of a SAE-CD composition can possess greater osmotic potential or greater water activity reducing power than a different second salt form of same SAE-CD.

In some embodiments, a sulfoalkyl ether cyclodextrin is complexed with one or more pharmaceutically acceptable cations selected from, e.g., $H^+$, alkali metals (e.g., $Li^+$, $Na^+$, $K^+$), alkaline earth metals (e.g., $Ca^{+2}$, $Mg^{+2}$), ammonium ions and amine cations such as the cations of ($C_1$-$C_6$)-alkylamines, piperidine, pyrazine, ($C_1$-$C_6$)-alkanolamine, ethylenediamine and ($C_4$-$C_8$)-cycloalkanolamine, and the like, and combinations thereof.

Further exemplary sulfoalkyl ether (SAE)-CD derivatives include:

TABLE 1

| SAE$_x$-α-CD | SAE$_x$-β-CD | SAE$_x$-γ-CD |
|---|---|---|
| (Sulfoethyl ether)$_x$-α-CD | (Sulfoethyl ether)$_x$-β-CD | (Sulfoethyl ether)$_x$-γ-CD |
| (Sulfopropyl ether)$_x$-α-CD | (Sulfopropyl ether)$_x$-β-CD | (Sulfopropyl ether)$_x$-γ-CD |
| (Sulfobutyl ether)$_x$-α-CD | (Sulfobutyl ether)$_x$-β-CD | (Sulfobutyl ether)$_x$-γ-CD |
| (Sulfopentyl ether)$_x$-α-CD | (Sulfopentyl ether)$_x$-β-CD | (Sulfopentyl ether)$_x$-γ-CD |
| (Sulfohexyl ether)$_x$-α-CD | (Sulfohexyl ether)$_x$-β-CD | (Sulfohexyl ether)$_x$-γ-CD | wherein x denotes the average degree of substitution. In some embodiments, the alkylated cyclodextrins are formed as salts.

Various embodiments of a sulfoalkyl ether cyclodextrin include eicosa-O-(methyl)-6G-O-(4-sulfobutyl)-β-cyclodextrin, heptakis-O-(sulfomethyl)-tetradecakis-O-(3-sulfopropyl)-β-cyclodextrin, heptakis-O-[(1,1-dimethylethyl)dimethylsilyl]-tetradecakis-O-(3-sulfopropyl)-β-cyclodextrin, heptakis-O-(sulfomethyl)-tetradecakis-O-(3-sulfopropyl)-β-cyclodextrin, and heptakis-O-[(1,1-dimethylethyl)dimethylsilyl]-tetradecakis-O-(sulfomethyl)-β-cyclodextrin. Other known alkylated cyclodextrins containing a sulfoalkyl moiety include sulfoalkylthio and sulfoalkylthioalkyl ether derivatives such as octakis-(S-sulfopropyl)-octathio-7-cyclodextrin, octakis-O-[3-[(2-sulfoethyl)thio]propyl]-β-cyclodextrin], and octakis-S-(2-sulfoethyl)-octathio-7-cyclodextrin.

In some embodiments, an alkylated cyclodextrin composition of the present disclosure is a sulfoalkyl ether-β-cyclodextrin composition having an ADS of 2 to 9, 4 to 8, 4 to 7.5, 4 to 7, 4 to 6.5, 4.5 to 8, 4.5 to 7.5, 4.5 to 7, 5 to 8, 5 to 7.5, 5 to 7, 5.5 to 8, 5.5 to 7.5, 5.5 to 7, 5.5 to 6.5, 6 to 8, 6 to 7.5, 6 to 7.1, 6.5 to 7.1, 6.2 to 6.9, or 6.5 per alkylated cyclodextrin, and the remaining substituents are —H.

In some embodiments, the alkylated cyclodextrin is a compound of Formula III:

III

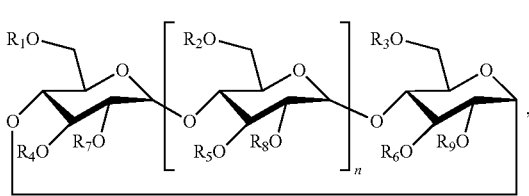

wherein n is 4, 5 or 6, wherein $R_1$, $R_2$, $R_3$, $R_4$, $R_5$, $R_6$, $R_7$, $R_8$ and $R_9$ are independently selected from: —H, a straight-chain or branched $C_1$-$C_8$-(alkylene)-$SO_3^-$ group, and an optionally substituted straight-chain or branched C1-C6 group.

A water soluble alkylated cyclodextrin composition can comprise an alkyl ether (AE)-cyclodextrin compound, or mixture of compounds, of the Formula IV:

IV

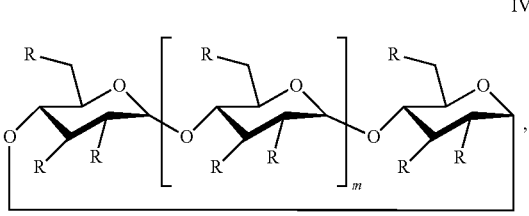

wherein: m is 4, 5 or 6; R is independently selected at each occurrence from the group consisting of —OH and AE; and AE is —O—($C_1$-$C_6$ alkyl); provided that at least one R is —OH; and at least one AE is present.

Further exemplary AE-CD derivatives include:

TABLE 2

| (Alkylether)$_y$-α-CD | (Alkylether)$_y$-β-CD | (Alkylether)$_y$-γ-CD |
|---|---|---|
| ME$_y$-α-CD | ME$_y$-β-CD | ME$_y$-γ-CD |
| EE$_y$-α-CD | EE$_y$-β-CD | EE$_y$-γ-CD |
| PE$_y$-α-CD | PE$_y$-β-CD | PE$_y$-γ-CD |
| BE$_y$-α-CD | BE$_y$-β-CD | BE$_y$-γ-CD |
| PtE$_y$-α-CD | PtE$_y$-β-CD | PtE$_y$-γ-CD |
| HE$_y$-α-CD | HE$_y$-β-CD | HE$_y$-γ-CD | wherein ME denotes methyl ether, EE denotes ethyl ether, PE denotes propyl ether, BE denotes butyl ether, PtE denotes pentyl ethyl, HE denotes hexyl ether, and y denotes the average degree of substitution.

10

A water soluble alkylated cyclodextrin composition can comprise a HAE-cyclodextrin compound, or mixture of compounds, of the Formula V:

V

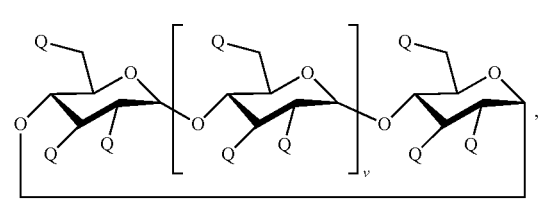

wherein: "v" is 4, 5 or 6; "Q" is independently selected at each occurrence from the group consisting of —OH, and -HAE; and HAE is HO($C_1$-$C_6$ alkyl)-O—, provided that at least one -HAE moiety is present.

Further exemplary hydroxyalkyl ether (HAE)-CD derivatives include:

TABLE 3

| (HAE)$_z$-α-CD | (HAE)$_z$-β-CD | (HAE)$_z$-γ-CD |
|---|---|---|
| HMEz-α-CD | HMEz-β-CD | HMEz-γ-CD |
| HEEz-α-CD | HEEz-β-CD | HEEz-γ-CD |
| HPEz-α-CD | HPEz-β-CD | HPEz-γ-CD |
| HBEz-α-CD | HBEz-β-CD | HBEz-γ-CD |
| HPtEz-α-CD | HPtEz-β-CD | HPtEz-γ-CD |
| HHEz-α-CD | HHEz-β-CD | HHEz-γ-CD | wherein HME denotes hydroxymethyl ether, HEE denotes hydroxyethyl ether, HPE denotes hydroxypropyl ether, HBE denotes hydroxybutyl ether, HPtE denotes hydroxypentyl ether, HHE denotes hydroxyhexyl ether, and z denotes the average degree of substitution.

A water soluble alkylated cyclodextrin composition can comprise a SAE-AE-CD compound, or mixture of compounds, of Formula VI:

VI

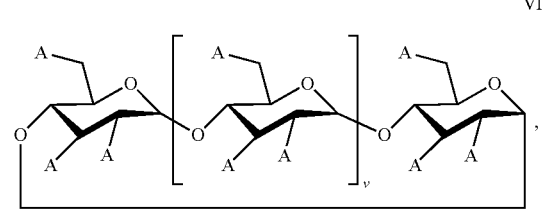

wherein: "v" is 4, 5 or 6; "A" is independently selected at each occurrence from the group consisting of —OH, -SAET and -AE; x is the degree of substitution for the SAET moiety and is 1 to 3v+5; y is the degree of substitution for the AE moiety and is 1 to 3v+5; -SAE is —O—($C_2$-$C_6$ alkylene)-$SO_3^-$; T is independently at each occurrence a cation; and AE is —O($C_1$-$C_3$ alkyl); provided that at least one -SAET moiety and at least one -AE moiety are present; and the sum of x, y and the total number of —OH groups in an alkylated cyclodextrin is 3v+6.

Specific embodiments of the derivatives of the present disclosure include those wherein: 1) the alkylene moiety of the SAE has the same number of carbons as the alkyl moiety of the AE; 2) the alkylene moiety of the SAE has a different number of carbons than the alkyl moiety of the AE; 3) the alkyl and alkylene moieties are independently selected from the group consisting of a straight chain or branched moiety; 4) the alkyl and alkylene moieties are independently selected from the group consisting of a saturated or unsaturated moiety; 5) the ADS for the SAE group is greater than or approximates the ADS for the AE group; or 6) the ADS for the SAE group is less than the ADS for the AE group.

A water soluble alkylated cyclodextrin composition can comprise a SAE-HAE-CD compound, or mixture of compounds, of Formula VII:

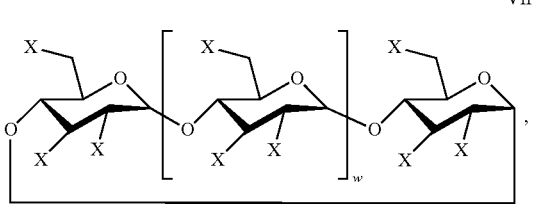

VII wherein: "v" is 4, 5 or 6; "X" is independently selected at each occurrence from the group consisting of —OH, SAET and HAE; x is the degree of substitution for the SAET moiety and is 1 to 3w+5; y is the degree of substitution for the HAE moiety and is 1 to 3w+5; -SAE is —O—(C$_2$-C$_6$ alkylene)-SO$_3^-$; T is independently at each occurrence a cation; and HAE is HO—(C$_1$-C$_6$ alkyl)-O—; provided that at least one -SAET moiety and at least one -HAE moiety are present; and the sum of x, y and the total number of —OH groups in an alkylated cyclodextrin is 3w+6.

The alkylated cyclodextrin can include SAE-CD, HAE-CD, SAE-HAE-CD, HANE-CD, HAE-AE-CD, HAE-SAE-CD, AE-CD, SAE-AE-CD, neutral cyclodextrin, anionic cyclodextrin, cationic cyclodextrin, halo-derivatized cyclodextrin, amino-derivatized cyclodextrin, nitrile-derivatized cyclodextrin, aldehyde-derivatized cyclodextrin, carboxylate-derivatized cyclodextrin, sulfate-derivatized cyclodextrin, sulfonate-derivatized cyclodextrin, mercapto-derivatized cyclodextrin, alkylamino-derivatized cyclodextrin, or succinyl-derivatized cyclodextrin.

In some embodiments, alkylated cyclodextrins such as mixed ether alkylated cyclodextrins include, by way of example, those listed Table 4 below.

TABLE 4

| Mixed ether CD derivative | Mixed ether CD derivative | Mixed ether CD derivative |
|---|---|---|
| Sulfobutyl-hydroxybutyl-CD (SBE-HBE-CD) | Sulfopropyl-hydroxybutyl-CD (SPE-HBE-CD) | Sulfoethyl-hydroxybutyl-CD (SEE-HBE-CD) |
| Sulfobutyl-hydroxypropyl-CD (SBE-HPE-CD) | Sulfopropyl-hydroxypropyl-CD (SPE-HPE-CD) | Sulfoethyl-hydroxypropyl-CD (SEE-HPE-CD) |
| Sulfobutyl-hydroxyethyl-CD (SBE-HEE-CD) | Sulfopropyl-hydroxyethyl-CD (SPE-HEE-CD) | Sulfoethyl-hydroxyethyl-CD (SEE-HEE-CD) |
| Sulfobutyl-hydroxybutenyl-CD (SBE-HBNE-CD) | Sulfopropyl-hydroxybutenyl-CD (SPE-HBNE-CD) | Sulfoethyl-hydroxybutenyl-CD (SEE-HBNE-CD) |
| Sulfobutyl-ethyl (SBE-EE-CD) | Sulfopropyl-ethyl (SPE-EE-CD) | Sulfoethyl-ethyl (SEE-EE-CD) |
| Sulfobutyl-methyl (SBE-ME-CD) | Sulfopropyl-methyl (SPE-ME-CD) | Sulfoethyl-methyl (SEE-ME-CD) |
| Sulfobutyl-propyl (SBE-PE-CD) | Sulfopropyl-propyl (SPE-PE-CD) | Sulfoethyl-propyl (SEE-PE-CD) |
| Sulfobutyl-butyl (SBE-BE-CD) | Sulfopropyl-butyl (SPE-BE-CD) | Sulfoethyl-butyl (SEE-BE-CD) |
| Sulfobutyl-carboxymethyl-CD (SBE-CME-CD) | Sulfopropyl-carboxymethyl-CD (SPE-CME-CD) | Sulfoethyl-carboxymethyl-CD (SEE-CME-CD) |
| Sulfobutyl-carboxyethyl-CD (SBE-CEE-CD) | Sulfopropyl-carboxyethyl-CD (SPE-CEE-CD) | Sulfoethyl-carboxyethyl-CD (SEE-CEE-CD) |
| Sulfobutyl-acetate-CD (SBE-AA-CD) | Sulfopropyl-acetate-CD (SPE-AA-CD) | Sulfoethyl-acetate-CD (SEE-AA-CD) |
| Sulfobutyl-propionate-CD (SBE-PA-CD) | Sulfopropyl-propionate-CD (SPE-PA-CD) | Sulfoethyl-propionate-CD (SEE-PA-CD) |
| Sulfobutyl-butyrate-CD (SBE-BA-CD) | Sulfopropyl-butyrate-CD (SPE-BA-CD) | Sulfoethyl-butyrate-CD (SEE-BA-CD) |
| Sulfobutyl-methoxycarbonyl-CD (SBE-MC-CD) | Sulfopropyl-methoxycarbonyl-CD (SPE-MC-CD) | Sulfoethyl-methoxycarbonyl-CD (SEE-MC-CD) |
| Sulfobutyl-ethoxycarbonyl-CD (SBE-EC-CD) | Sulfopropyl-ethoxycarbonyl-CD (SPE-EC-CD) | Sulfoethyl-ethoxycarbonyl-CD (SEE-EC-CD) |
| Sulfobutyl-propoxycarbonyl-CD (SBE-PC-CD) | Sulfopropyl-propoxycarbonyl-CD (SPE-PC-CD) | Sulfoethyl-propoxycarbonyl-CD (SEE-PC-CD) |
| Hydroxybutyl-hydroxybutenyl-CD (HBE-HBNE-CD) | Hydroxypropyl-hydroxybutenyl-CD (HPE-HBNE-CD) | Hydroxyethyl-hydroxybutenyl-CD (HEE-HBNE-CD) |
| Hydroxybutyl-ethyl-CD (HBE-EE-CD) | Hydroxypropyl-ethyl-CD (HPE-EE-CD) | Hydroxyethyl-ethyl-CD (HEE-EE-CD) |
| Hydroxybutyl-methyl-CD (HBE-ME-CD) | Hydroxypropyl-methyl-CD (HPE-ME-CD) | Hydroxyethyl-methyl-CD (HEE-ME-CD) |
| Hydroxybutyl-propyl-CD (HBE-PE-CD) | Hydroxypropyl-propyl-CD (HPE-PE-CD) | Hydroxyethyl-propyl-Cd (HEE-PE-CD) |
| Hydroxybutyl-butyl (HBE-BE-CD) | Hydroxypropyl-butyl (HPE-BE-CD) | Hydroxyethyl-butyl (HEE-BE-CD) |

TABLE 4-continued

| Mixed ether CD derivative | Mixed ether CD derivative | Mixed ether CD derivative |
| --- | --- | --- |
| Hydroxybutyl-carboxymethyl-CD (HBE-CME-CD) | Hydroxypropyl-carboxymethyl-CD (HPE-CME-CD) | Hydroxyethyl-carboxymethyl-CD (HEE-CME-CD) |
| Hydroxybutyl-carboxyethyl-CD (HBE-CEE-CD) | Hydroxypropyl-carboxyethyl-CD (HPE-CEE-CD) | Hydroxyethyl-carboxyethyl-CD (HEE-CEE-CD) |
| Hydroxybutyl-acetate-CD (HBE-AA-CD) | Hydroxypropyl-acetate-CD (HPE-AA-CD) | Hydroxyethyl-acetate-CD (HEE-AA-CD) |
| Hydroxybutyl-propionate-CD (HBE-PA-CD) | Hydroxypropyl-propionate-CD (HPE-PA-CD) | Hydroxyethyl-propionate-CD (HEE-PA-CD) |
| Hydroxybutyl-butyrate-CD (HBE-BA-CD) | Hydroxypropyl-butyrate-CD (HPE-BA-CD) | Hydroxyethyl-butyrate-CD (HEE-BA-CD) |
| Hydroxybutyl-methoxycarbonyl-CD (HBE-MC-CD) | Hydroxypropyl-methoxycarbonyl-CD (HPE-MC-CD) | Hydroxyethyl-methoxycarbonyl-CD (HEE-MC-CD) |
| Hydroxybutyl-ethoxycarbonyl-CD (HBE-EC-CD) | Hydroxypropyl-ethoxycarbonyl-CD (HPE-EC-CD) | Hydroxyethyl-ethoxycarbonyl-CD (HEE-EC-CD) |
| Hydroxybutyl-propoxycarbonyl-CD (HBE-PC-CD) | Hydroxypropyl-propoxycarbonyl-CD (HPE-PC-CD) | Hydroxyethyl-propoxycarbonyl-CD (HEE-PC-CD) |
| Hydroxybutenyl-ethyl-CD (HBNE-EE-CD) | Hydroxypropenyl-ethyl-CD (HPNE-EE-CD) | Hydroxypentenyl-ethyl-CD (HPTNE-EE-CD) |
| Hydroxybutenyl-methyl-CD (HBNE-ME-CD) | Hydroxypropenyl-methyl-CD (HPNE-ME-CD) | Hydroxypentenyl-methyl-CD (HPTNE-ME-CD) |
| Hydroxybutenyl-propyl-CD (HBNE-PE-CD) | Hydroxypropenyl-propyl-CD (HPNE-PE-CD) | Hydroxypentenyl-propyl-CD (HPTNE-PE-CD) |
| Hydroxybutenyl-butyl-CD (HBNE-BE-CD) | Hydroxypropenyl-butyl-CD (HPNE-BE-CD) | Hydroxypentenyl-butyl-CD (HPTNE-BE-CD) |
| Hydroxybutenyl-carboxymethyl-CD (HBNE-CME-CD) | Hydroxypropenyl-carboxymethyl-CD (HPNE-CME-CD) | Hydroxypentenyl-carboxymethyl-CD (HPTNE-CME-CD) |
| Hydroxybutenyl-carboxyethyl-CD (HBNE-CEE-CD)- | Hydroxypropenyl-carboxyethyl-CD (HPNE-CEE-CD) | Hydroxypentenyl-carboxyethyl-CD (HPTNE-CEE-CD) |
| Hydroxybutenyl-acetate-CD (HBNE-AA-CD) | Hydroxypropenyl-acetate-CD (HPNE-AA-CD) | Hydroxypentenyl-acetate-CD (HPTNE-AA-CD) |
| Hydroxybutenyl-propionate-CD (HBNE-PA-CD) | Hydroxypropenyl-propionate-CD (HPNE-PA-CD) | Hydroxypentenyl-propionate-CD (HPTNE-PA-CD) |
| Hydroxybutenyl-butyrate-CD (HBNE-BA-CD) | Hydroxypropenyl-butyrate-CD (HPNE-BA-CD) | Hydroxypentenyl-butyrate-CD (HPTNE-BA-CD) |
| Hydroxybutenyl-methoxycarbonyl-CD (HBNE-MC-CD) | Hydroxypropenyl-methoxycarbonyl-CD (HPNE-MC-CD) | Hydroxypentenyl-methoxycarbonyl-CD (HPTNE-MC-CD) |
| Hydroxybutenyl-ethoxycarbonyl-CD (HBNE-EC-CD) | Hydroxypropenyl-ethoxycarbonyl-CD (HPNE-EC-CD) | Hydroxypentenyl-ethoxycarbonyl-CD (HPTNE-EC-CD) |
| Hydroxybutenyl-propoxycarbonyl-CD (HBNE-PC-CD) | Hydroxypropenyl-propoxycarbonyl-CD (HPNE-PC-CD) | Hydroxypentenyl-propoxycarbonyl-CD (HPTNE-PC-CD) |

Additional examples of alkylated cyclodextrins that may be prepared by the methods disclosed herein are described in U.S. Pat. Nos. 5,438,133, 6,479,467, and 6,610,671, the disclosure of each of which is incorporated by reference herein in its entirety.

Within a given alkylated cyclodextrin composition, the substituents of the alkylated cyclodextrin(s) thereof can be the same or different. For example, SAE or HAE moieties can have the same type or different type of alkylene (alkyl) radical upon each occurrence in an alkylated cyclodextrin composition. In such embodiments, the alkylene radical in the SAE or HAE moiety can be ethyl, propyl, butyl, pentyl or hexyl in each occurrence in an alkylated cyclodextrin composition.

The alkylated cyclodextrins can differ in their degree of substitution by functional groups, the number of carbons in the functional groups, their molecular weight, the number of glucopyranose units contained in the base cyclodextrin used to form the derivatized cyclodextrin and or their substitution patterns. In addition, the derivatization of a cyclodextrin with functional groups occurs in a controlled, although not exact manner. For this reason, the degree of substitution is actually a number representing the average number of functional groups per cyclodextrin (for example, $SBE_7$-$\beta$-CD has an average of 7 substitutions per cyclodextrin). Thus, it has an average degree of substitution ("ADS") of 7. In some embodiments, the ADS may be determined by techniques include capillary electrophoresis (CE), high performance liquid chromatography (HPLC), nuclear magnetic resonance (NMR) spectroscopy, or a combination thereof. In addition, the regiochemistry of substitution of the hydroxyl groups of the cyclodextrin is variable with regard to the substitution of specific hydroxyl groups of the hexose ring. For this reason, substitution of the different hydroxyl groups is likely to occur during manufacture of the derivatized cyclodextrin, and a particular derivatized cyclodextrin will possess a preferential, although not exclusive or specific, substitution pattern. Given the above, the molecular weight of a particular derivatized cyclodextrin composition can vary from batch to batch.

In a single parent cyclodextrin molecule, there are 3v+6 hydroxyl moieties available for derivatization. Where v=4

(α-cyclodextrin), "y" the degree of substitution for the moiety can range in value from 1 to 18. Where $v=5$ (β-cyclodextrin), "y" the degree of substitution for the moiety can range in value from 1 to 21. Where $v=6$ (7-cyclodextrin), "y" the degree of substitution for the moiety can range in value from 1 to 24. In general, "y" also ranges in value from 1 to $3v+g$, where g ranges in value from 0 to 5. In some embodiments, "y" ranges from 1 to $2v+g$, or from 1 to $1v+g$.

The degree of substitution ("DS") for a specific moiety (SAE, HAE or AE, for example) is a measure of the number of SAE (HAE or AE) substituents attached to an individual cyclodextrin molecule, in other words, the moles of substituent per mole of cyclodextrin. Therefore, each substituent has its own DS for an individual alkylated cyclodextrin species. The average degree of substitution ("ADS") for a substituent is a measure of the total number of substituents present per cyclodextrin molecule for the distribution of alkylated cyclodextrins within an alkylated cyclodextrin composition of the present disclosure. Therefore, $SAE_4$-CD has an ADS (per CD molecule) of 4.

Some embodiments of the present disclosure include those wherein: 1) more than half of the hydroxyl moieties of the alkylated cyclodextrin are derivatized; 2) half or less than half of the hydroxyl moieties of the alkylated cyclodextrin are derivatized; 3) the substituents of the alkylated cyclodextrin are the same upon each occurrence; 4) the substituents of the alkylated cyclodextrin comprise at least two different substituents; or 5) the substituents of the alkylated cyclodextrin comprise one or more of substituents selected from the group consisting of unsubstituted alkyl, substituted alkyl, halide (halo), haloalkyl, amine (amino), aminoalkyl, aldehyde, carbonylalkyl, nitrile, cyanoalkyl, sulfoalkyl, hydroxyalkyl, carboxyalkyl, thioalkyl, unsubstituted alkylene, substituted alkylene, aryl, arylalkyl, heteroaryl, and heteroarylalkyl.

Alkylated cyclodextrin compositions can comprise multiple alkylated cyclodextrin molecules differing in degree of substitution. For example, an alkylated cyclodextrin molecule can have 1, 2, 3, 4, 5, 6, 7, 8, 9, 10, 11, 12, or more of the hydroxyl groups of the parent cyclodextrin functionalized with a substituent, e.g., a sulfoalkyl ether. In such compositions, the average degree of substitution (ADS) can be calculated, as described herein, based on the relative amounts of alkylated cyclodextrin molecules having a particular degree of substitution. As a consequence, the ADS for SAE of a SAE-CD derivative composition represents a weighted average of the degree of substitution of the individual SAE-CD molecules in the composition. For example, a $SAE_{5.2}$-CD composition comprises a distribution of multiple $SAE_x$-CD molecules, wherein "x" (the DS for SAE groups) can range from integers having values of 1 to 12 for individual cyclodextrin molecules; however, the population of SAE-cyclodextrin molecules is such that the average value for "x" (the ADS for SAE groups) is 5.2.

The alkylated cyclodextrin compositions can have a high to moderate to low ADS. The alkylated cyclodextrin compositions can also have a wide or narrow "span," which is the number of alkylated cyclodextrin molecules with differing degrees of substitution within an alkylated cyclodextrin composition. For example, an alkylated cyclodextrin composition comprising a single species of alkylated cyclodextrin having a single degree of substitution is said to have a span of one, and in such a case, the degree of substitution for the alkylated cyclodextrin molecule would equal the ADS of its alkylated cyclodextrin composition. An electropherogram, for example, of an alkylated cyclodextrin with a span of one should have only one alkylated cyclodextrin species with respect to degree of substitution. An alkylated cyclodextrin composition having a span of two comprises two individual alkylated cyclodextrin species differing in their degree of substitution, and its electropherogram, for example, would indicate two different alkylated cyclodextrin species differing in degree of substitution. Likewise, the span of an alkylated cyclodextrin composition having a span of three comprises three individual alkylated cyclodextrin species differing in their degree of substitution. The span of an alkylated cyclodextrin composition typically ranges from 5 to 15, or 7 to 12, or 8 to 11.

A parent cyclodextrin includes a secondary hydroxyl group on the C-2 and C-3 positions of the glucopyranose residues forming the cyclodextrin and a primary hydroxyl on the C-6 position of the same. Each of these hydroxyl moieties is available for derivatization by substituent precursor. Depending upon the synthetic methodology employed, the substituent moieties can be distributed randomly or in a somewhat ordered manner among the available hydroxyl positions. The regioisomerism of derivatization by the substituent can also be varied as desired. The regioisomerism of each composition is independently selected. For example, a majority of the substituents present can be located at a primary hydroxyl group or at one or both of the secondary hydroxyl groups of the parent cyclodextrin. In some embodiments, the primary distribution of substituents is C-3>C-2>C-6, while in other embodiments the primary distribution of substituents is C-2>C-3>C-6. Some embodiments of the present disclosure include an alkylated cyclodextrin molecule wherein a minority of the substituent moieties is located at the C-6 position, and a majority of the substituent moieties is located at the C-2 and/or C-3 position. Still other embodiments of the present disclosure include an alkylated cyclodextrin molecule wherein the substituent moieties are substantially evenly distributed among the C-2, C-3, and C-6 positions.

An alkylated cyclodextrin composition comprises a distribution of plural individual alkylated cyclodextrin species, each species having an individual degree of substitution ("IDS"). The content of each of the cyclodextrin species in a particular composition can be quantified using capillary electrophoresis. The method of analysis (capillary electrophoresis, for example, for charged alkylated cyclodextrins) is sufficiently sensitive to distinguish between compositions having only 5% of one alkylated cyclodextrin and 95% of another alkylated cyclodextrin from starting alkylated cyclodextrin compositions containing a single alkylated cyclodextrin.

The above-mentioned variations among the individual species of alkylated cyclodextrins in a distribution can lead to changes in the complexation equilibrium constant K1:1 which in turn will affect the required molar ratios of the derivatized cyclodextrin to active agent. The equilibrium constant is also somewhat variable with temperature and allowances in the ratio are required such that the agent remains solubilized during the temperature fluctuations that can occur during manufacture, storage, transport, and use. The equilibrium constant can also vary with pH and allowances in the ratio can be required such that the agent remains solubilized during pH fluctuations that can occur during manufacture, storage, transport, and use. The equilibrium constant can also vary due the presence of other excipients (e.g., buffers, preservatives, antioxidants). Accordingly, the ratio of derivatized cyclodextrin to active agent can be varied from the ratios set forth herein in order to compensate for the above-mentioned variables.

The alkylated cyclodextrins made according to a process of the present disclosure can be employed in compositions, formulations, methods and systems as such those disclosed in U.S. Pat. Nos. 5,134,127, 5,376,645, 5,914,122, 5,874, 418, 6,046,177, 6,133,248, 6,153,746, 6,407,079, 6,869,939, 7,034,013, 7,625,878, 7,629,331, 7,635,773, 9,493,582, and 10,040,872; U.S. Pub. Nos. 2005/0164986, 2005/0186267, 2005/0250738, 2006/0258537, 2007/0020196, 2007/0020298, 2007/0020299, 2007/0175472, 2007/0202054, 2008/0194519, 2009/0011037, 2009/0012042, 2009/0123540; U.S. application Ser. Nos. 12/404,174, 12/407, 734, 61/050,918, 61/177,718, and 61/182,560; and PCT International Application Nos. PCT/US06/62346, PCT/US07/71758, PCT/US07/71748, PCT/US07/72387, PCT/US07/72442, PCT/US07/78465, PCT/US08/61697, PCT/US08/61698, PCT/US08/70969, and PCT/US08/82730, the entire disclosures of which are hereby incorporated by reference. The alkylated cyclodextrins prepared according to the processes herein can also be used as suitable substitutes for other known grades of alkylated cyclodextrins possessing the same functional groups.

In some embodiments, an alkylated cyclodextrin possesses greater water solubility than a corresponding cyclodextrin from which an alkylated cyclodextrin composition of the present disclosure is prepared. For example, in some embodiments, an underivatized cyclodextrin is utilized as a starting material, e.g., α-, β- or γ-cyclodextrin, commercially available from, e.g., WACKER BIOCHEM CORP. (Adrian, MI), and other sources. Underivatized cyclodextrins have limited water solubility compared to the alkylated cyclodextrins compositions of the present disclosure. For example, underivatized α-CD, β-CD, γ-CD have a solubility in water solubility of about 145 g/L, 18.5 g/L, and 232 g/L, respectively, at saturation.

The water-soluble alkylated cyclodextrin composition is optionally processed to remove a major portion (e.g., >50%) of an underivatized cyclodextrin, or other contaminants.

The terms "alkylene" and "alkyl," as used herein (e.g., in the —O—(C$_2$-C$_6$-alkylene)SO$_3^-$ group or in the alkylamine cations), include linear, cyclic, and branched, saturated and unsaturated (i.e., containing one or more double bonds), divalent alkylene groups and monovalent alkyl groups, respectively. For example, SAE or HAE moieties can have the same type or different type of alkylene (alkyl) radical upon each occurrence in an alkylated cyclodextrin composition. In such embodiments, the alkylene radical in the SAE or HAE moiety can be ethyl, propyl, butyl, pentyl or hexyl in each occurrence in an alkylated cyclodextrin composition.

The term "alkanol" in this text likewise includes both linear, cyclic and branched, saturated and unsaturated alkyl components of the alkanol groups, in which the hydroxyl groups can be situated at any position on the alkyl moiety. The term "cycloalkanol" includes unsubstituted or substituted (e.g., by methyl or ethyl) cyclic alcohols.

In some embodiments, the present disclosure provides an alkyl ether cyclodextrin (AE-CD) composition, comprising an alkyl ether cyclodextrin having an average degree of substitution of 2 to 9, and less than 0.1% (w/w) of a chloride. In some embodiments, the present disclosure provides an AE-CD composition, comprising an alkyl ether cyclodextrin having an average degree of substitution of 2 to 9, and less than 0.05% (w/w) of a chloride. In some embodiments, the present disclosure provides an AE-CD composition, comprising an alkyl ether cyclodextrin having an average degree of substitution of 2 to 9, and less than 0.01% (w/w) of a chloride. In some embodiments, the present disclosure provides an AE-CD composition, comprising an alkyl ether cyclodextrin having an average degree of substitution of 2 to 9, and less than 0.002% (w/w) of a chloride. In some embodiments, the alkyl ether cyclodextrin composition is not a sulfobutyl ether cyclodextrin composition. In some embodiments, the alkyl ether cyclodextrin is not a sulfobutyl ether β-cyclodextrin.

In some embodiments, the average degree of substitution of the AE-CD is 4.5 to 7.5. In some embodiments, the average degree of substitution of the AE-CD is 6 to 7.5. In some embodiments, the average degree of substitution of the AE-CD is 6.2 to 6.9.

In some embodiments, the present disclosure provides a composition comprising an AE-CD and an active agent.

In some embodiments, the present disclosure provides a sulfoalkyl ether cyclodextrin (SAE-CD) composition comprising a sulfoalkyl ether cyclodextrin having an average degree of substitution of 2 to 9, and less than 0.1% (w/w) of a chloride. In some embodiments, the present disclosure provides a SAE-CD composition comprising a sulfoalkyl ether cyclodextrin having an average degree of substitution of 2 to 9, and less than 0.05% (w/w) of a chloride. In some embodiments, the present disclosure provides a SAE-CD composition, comprising a sulfoalkyl ether cyclodextrin having an average degree of substitution of 2 to 9, and less than 0.01% (w/w) of a chloride. In some embodiments, the present disclosure provides a SAE-CD composition, comprising a sulfoalkyl ether cyclodextrin having an average degree of substitution of 2 to 9, and less than 0.002% (w/w) of a chloride.

In some embodiments, the sulfoalkyl ether cyclodextrin is a compound of Formula (II):

Formula (II)

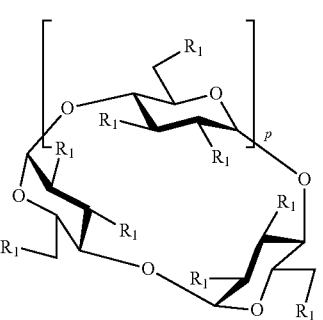

wherein p is 4, 5, or 6, and R$_1$ is independently selected at each occurrence from —OH or —O—(C$_2$-C$_6$ alkylene)-SO$_3^-$-T, wherein T is independently selected at each occurrence from pharmaceutically acceptable cations, provided that at least one R$_1$ is —OH and at least one R$_1$ is O—(C$_2$-C$_6$ alkylene)-SO$_3^-$-T. In some embodiments, R$_1$ is independently selected at each occurrence from —OH or —O—(C$_4$ alkylene)-SO$_3^-$-T, and -T is Na$^+$ at each occurrence.

In some embodiments, T may be associated with an ion exchange resin, poly-L-lysine, polycationic chitosan, or any combination thereof.

In some embodiments, the average degree of substitution of the SAE-CD is 4.5 to 7.5. In some embodiments, the average degree of substitution of the SAE-CD is 6 to 7.5. In some embodiments, the average degree of substitution of the SAE-CD is 6.2 to 6.9.

In some embodiments, the present disclosure provides a composition comprising a SAE-CD and an active agent.

The present disclosure describes several methods for preparing an alkylated cyclodextrins. In general, an underivatized cyclodextrin starting material in neutral to alkaline aqueous media is exposed to substituent precursor. The substituent precursor can be added incrementally or as a bolus, and the substituent precursor can be added before, during, or after exposure of the cyclodextrin starting material to the optionally alkaline aqueous media. Additional alkaline material or buffering material can be added as needed to maintain the pH within a desired range. The derivatization reaction can be conducted at ambient to elevated temperatures. Once derivatization has proceeded to the desired extent, the reaction is optionally quenched by addition of an acid. The reaction milieu is further processed (e.g., solvent precipitation, filtration, centrifugation, evaporation, concentration, drying, chromatography, dialysis, and/or ultrafiltration) to remove undesired materials and form the target composition. After final processing, the composition can be in the form of a solid, liquid, semi-solid, gel, syrup, paste, powder, aggregate, granule, pellet, compressed material, reconstitutable solid, suspension, glass, crystalline mass, amorphous mass, particulate, bead, emulsion, or wet mass.

The disclosure provides a process of making an alkylated cyclodextrin, optionally having a pre-determined degree of substitution, the process comprising: combining an unsubstituted cyclodextrin starting material with an alkylating agent in an amount sufficient to effect the pre-determined degree of substitution, in the presence of an alkali metal hydroxide; conducting alkylation of the cyclodextrin within a pH of 9 to 11 until residual unreacted cyclodextrin is less than 0.5% by weight, or less than 0.1%; adding additional hydroxide in an amount sufficient to achieve the degree of substitution and allowing the alkylation to proceed to completion; and adding additional hydroxide to destroy any residual alkylating agent.

Adding an additional hydroxide can be conducted using a quantity of hydroxide, and under conditions (i.e., amount of additional hydroxide added, temperature, length of time during which the alkylating agent hydrolysis is conducted) such that the level of residual alkylating agent in the aqueous crude product is reduced to less than 20 ppm or less than 2 ppm.

It is possible that the reaction milieu or the partially purified aqueous solution will comprise unreacted alkylating agent. The alkylating agent can be degraded in situ by adding additional alkalizing agent or by heating a solution containing the agent. Degrading an excess alkylating agent will be required where unacceptable amounts of alkylating agent are present in the reaction milieu following termination of the mixing. The alkylating agent can be degraded in situ by adding additional alkalizing agent or by heating a solution containing the agent.

Degrading can be conducted by: exposing the reaction milieu to an elevated temperature of at least 60° C., at least 65° C., or 60° C. to 85° C., 60° C. to 80° C., or 60° C. to 95° C. for a period of at least 6 hours, at least 8 hours, 8 hours to 12 hours, 6 hours to 72 hours, or 48 hours to 72 hours, thereby degrading the alkylating agent in situ and reducing the amount of or eliminating the alkylating agent in the aqueous liquid.

After the reaction has been conducted as described herein, the aqueous medium containing the alkylated cyclodextrin can be neutralized to a pH of 7 in order to quench the reaction. The solution can then be diluted with water in order to lower viscosity, particularly if further purification is to be conducted. Further purifications can be employed, including, but not limited to, diafiltration on an ultrafiltration unit to purge the solution of reaction by-products such as salts (e.g., NaCl if sodium hydroxide was employed as the base) and other low molecular weight by-products. The product can further be concentrated by ultrafiltration. The product solution can then be treated with activated carbon in order to improve its color, reduce bioburden, and substantially remove one or more drug degrading impurities. The product can be isolated by a suitable drying technique such as freeze drying, spray drying, or vacuum drum drying.

The reaction can initially be prepared by dissolving an unsubstituted α-, β-, or γ-cyclodextrin starting material in an aqueous solution of base, usually a hydroxide such as lithium, sodium, or potassium hydroxide. The base may be present in a catalytic amount (i.e., a molar ratio of less than 1:1 relative to the cyclodextrin), to achieve a pre-determined or desired degree of substitution. That is, the base may be present in an amount less than one molar equivalent for each hydroxyl sought to be derivatized in the cyclodextrin molecule. Because cyclodextrins become increasingly soluble in aqueous solution as the temperature is raised, the aqueous reaction mixture containing base and cyclodextrin can be raised to a temperature of 50° C. to ensure complete dissolution. Agitation is generally employed throughout the course of the alkylation reaction.

After dissolution is complete, the alkylating agent is added to start the alkylation reaction. The total amount of alkylating agent added throughout the reaction will generally be in excess of the stoichiometric amount required to complete the reaction relative to the amount of cyclodextrin, since some of the alkylating agent is hydrolyzed and/or otherwise destroyed/degraded during the reaction such that it is not available for use in the alkylation reaction. The exact amount of alkylating agent to use for a desired degree of substitution can be determined through the use of trial runs. The entire amount of alkylating agent needed to complete the reaction can be added prior to initiating the reaction. Because the system is aqueous, the reaction is generally conducted at a temperature between 50° C. and 100° C. The reaction can be conducted at a temperature less than 100° C., so that specialized pressure equipment is not required. In general, a temperature of 65° C. to 95° C. is suitable.

During the initial phase of the reaction (herein referred to as the pH-control phase), care should be taken to monitor the pH and maintain it at least basic, or in at a pH of 8 to 11. Monitoring of pH can be effected conventionally as by using a standard pH meter. Adjustment of the pH can be effected by adding an aqueous solution of hydroxide, e.g., a 10-15% solution. During the initial pH-control phase, unreacted cyclodextrin is reacted to the extent that less than 0.5% by weight, or less than 0.1% by weight, of unreacted cyclodextrin remains in solution. Substantially the entire initial charge of cyclodextrin is thus reacted by being partially substituted, but to less than the desired pre-determined degree of substitution. Residual cyclodextrin can be monitored throughout this initial phase, for example by HPLC as described below, until a desired endpoint of less than 0.5%, or less than 0.1%, of residual cyclodextrin starting material, has been achieved. The pH can be maintained and/or raised by adding concentrated hydroxide to the reaction medium continuously or in discrete amounts as small increments. Addition in small increments is particularly suitable.

Once an alkylation procedure has been standardized or optimized so that it is known that particular amounts of reactants can be combined in a procedure which produces the desired degree of substitution in conjunction with low residual cyclodextrin, then the procedure can simply be checked at the end, as opposed to throughout or during the initial pH-control, to ensure that a low level of residual (unreacted) cyclodextrin starting material has been achieved. The following table sets forth a relationship between the amount of butane sultone charged into a reactor and the resulting average degree of substitution of the SAE-CD.

| Butane Sultone Charged (Approximate equivalents of BS per mole of cyclodextrin) | Corresponding Approximate Predetermined ADS for SAE-CD formed |
|---|---|
| 2 | 2 |
| 3 | 3 |
| 4 | 4 |
| 5 | 5 |
| 6 | 5-5.5 |
| 7 | 5.5 to 6.5 |
| 8 | 6.5 to 7 |
| 9 | 7-8 |
| 12 | 8-9 |

It is noted that the initial pH of the reaction medium can be above 11, for example after combining the initial charge of cyclodextrin starting material and base, but prior to addition of alkylating agent. After an alkylating agent has been added and the reaction commences, however, the pH quickly drops, necessitating addition of base to maintain a basic pH of about 8 to about 11.

Once the level of residual unreacted cyclodextrin has reached a desired level, e.g., below 0.5% by weight, during the pH control stage, the pH can be raised to above 11, for example a level above 12, by adding additional base to drive the reaction to completion. The pH can be at least 12 so that the reaction proceeds at a reasonable rate, but not so high that unreacted alkylating agent is hydrolyzed rapidly rather than reacting with cyclodextrin. During this latter phase of the reaction, additional substitution of the cyclodextrin molecule is effected until the pre-determined degree of substitution has been attained. The total amount of hydroxide added throughout the reaction is typically on the order of the amount stoichiometrically required plus a 10-20% molar excess relative to the amount of alkylating agent employed. The addition of more than a 10-20% excess is also feasible. The reaction end point, as noted above, can be detected by HPLC. A suitable temperature is 65° C. to 95° C. The HPLC system typically employs an anion exchange analytical column with pulsed amperometric detection (PAD). Elution can be by gradient using a two-solvent system, e.g., Solvent A being 25 mM (millimolar) aqueous sodium hydroxide, and Solvent B being 1 M sodium nitrate in 250 mM sodium hydroxide.

Once the alkylation reaction is complete and the low residual cyclodextrin end point has been reached, additional hydroxide can be added to destroy and/or degrade any residual alkylating agent. The additional hydroxide is typically added in an amount of 0.5 to 3 molar equivalents relative to cyclodextrin, and the reaction medium is allowed to continue heating at 65° C. to 95° C., typically for 6 hours to 72 hours.

After residual alkylating agent destruction, the resulting crude product can be additionally treated to produce a final product by being diluted, diafiltered to reduce or rid the product of low molecular weight components such as salts, concentrated, carbon treated, and dried.

The pH is initially monitored to ensure that it remains at 8 to 11 as the alkyl derivatization reaction proceeds. In this initial stage, addition of a hydroxide to facilitate the alkylation can be staged or step-wise. Monitoring the pH of the reaction ensures that the reaction can be controlled such that the entire initial stock of cyclodextrin starting material is essentially reacted to the extent of effecting, on average, at least one alkyl substitution per cyclodextrin molecule. The entire cyclodextrin reactant is thus consumed at the beginning of the process, so that the level of residual (unreacted) cyclodextrin in the crude product is low, relative to the crude product produced by a process which features initially combining the entire stoichiometric or excess amount of base with cyclodextrin and alkylating agent and allowing the reaction to proceed uncontrolled. After the entire charge of cyclodextrin starting material has been partially reacted, the remaining hydroxide can be added to drive the reaction to completion by finishing the alkyl substitution to the pre-determined, desired degree. After the initial charge of cyclodextrin has been consumed in the first pH-controlled phase, the rate of hydroxide addition is not critical. Thus, the hydroxide can be added (e.g., as a solution) continuously or in discrete stages. In addition, the pH of the reaction medium should be maintained above about 12 so that the rate of reaction is commercially useful. Additional methods for making alkylated cyclodextrins are described in U.S. Pat. No. 9,751,957, the disclosure of which is hereby incorporated by reference in its entirety.

Process for Removal of Impurities from Alkylated Cyclodextrin

The present disclosure provides a process for preparing an alkylated cyclodextrin composition, the process comprising: (a) mixing a cyclodextrin with an alkylating agent to form a reaction milieu comprising an alkylated cyclodextrin; (b) conducting a first one or more separations to form a first solution comprising the alkylated cyclodextrin, wherein the one of more separations comprises diafiltration through a first membrane; (c) treating the first solution with an activated carbon to produce a second alkylated cyclodextrin solution; and (d) conducting a second one or more separations to form a third alkylated cyclodextrin solution, wherein the one or more separations comprises nanofiltration through a second membrane. In some embodiments, the first membrane is an ultrafiltration membrane. In some embodiments, the second membrane is a nanofiltration membrane.

FIG. 1 provides a schematic representation of a process of the instant disclosure. In the first step (100), a reaction milieu comprising crude alkylated cyclodextrin is formed. In some embodiments, the reaction milieu of step (a) containing the crude alkylated cyclodextrin is purified by diafiltration and/or ultrafiltration (102), processes in which the crude product is contacted with a semipermeable membrane that passes low molecular weight impurities through the membrane. The filtration membrane can include nylon, TEFLON®, PVDF or another compatible material.

The molecular weight of the impurities passed through the membrane depends on the molecular weight cut-off (MWCO) for the membrane and can be varied as needed according to the particle size or molecular weight of species being separated from the alkylated cyclodextrin in a solution containing the same. For the instant disclosure, a membrane having a molecular weight cutoff of 1,000 Daltons ("Da") is typically employed. Diafiltrations and/or ultrafiltrations can be conducted with filtration membranes having a molecular weight cut-off of 500 Da to 2,000 Da, 500 Da to 1,500 Da, 750 Da to 1,250 Da, or 900 Da to 1,100 Da, or about 1,000 Da. For example, in some embodiments, the filtration membrane may have a MWCO of about 500 Da, 550 Da, 600 Da, 650 Da, 700 Da, 750 Da, 800 Da, 850 Da, 900 Da, 950 Da, 1,000 Da, 1050 Da, 1100 Da, 1150 Da, 1200 Da, or 1250 Da.

In some embodiments, the reaction milieu of step (a) is optionally diluted with solvent prior to the first one or more separations by diafiltration (102). In some embodiments the solvent is water. The reaction milieu is diluted to achieve a desired concentration of alkylated cyclodextrin in solution prior to the one or more separations. For example, in some embodiments, the concentration of alkylated cyclodextrin in the reaction milieu immediately prior to conducting the first one or more separations by diafiltration may be less than 10% (w/w), less than 9% (w/w), less than 8% (w/w), less than 7% (w/w), less than 6% (w/w), less than 5% (w/w), less than 4% (w/w). In some embodiments, the concentration of the alkylated cyclodextrin in the reaction milieu immediately prior to conducting the first one or more separations by diafiltration may be about 1% (w/w), 2% (w/w), 3% (w/w), 4% (w/w), 5% (w/w), 6% (w/w), 7% (w/w), 8% (w/w), or 9% (w/w). In some embodiments, the concentration of the alkylated cyclodextrin in the reaction milieu immediately prior to conducting the first one or more separations by diafiltration may be from 2% (w/w) to 9% (w/w), from 3% (w/w) to 8% (w/w), from 5% (w/w) to 8% (w/w), or from 4% (w/w) to 6% (w/w).

The solution obtained after diafiltration may be further treated with activated carbon to substantially remove impurities (104). A wide variety of activated carbon is available. For example, Norit-Americas commercializes over 150 different grades and varieties of activated carbon under trademarks such as DARCO®, HYDRODARCO®, NORIT®, BENTONORIT®, PETRODARCO®, and SORBONORIT®. The carbons differ in particle size, application, method of activation, and utility. For example, some activated carbons are optimized for color and/or flavor removal. Other activated carbons are optimized for removal of protein, mineral, and/or amino acid moieties, or for clarifying solutions.

Activated carbon suitable for use in the process of the present disclosure can be phosphate-free, and can be powder or granular, or a suspension or slurry produced therefrom. Generally, phosphate-free activated carbon is a carbon that was not activated using, or otherwise exposed to, phosphoric acid. In some embodiments, the activated carbon used in the processes described herein is phosphate free. In some embodiments the activated carbon used in the processes described herein is granular. In some embodiments the activated carbon used in the processes described herein is steam activated.

Activated carbons suitable for use according to the present disclosure include, but are not limited to: DARCO® 4×12, 12×20, or 20×40 granular from lignite, steam activated (Norit Americas, Inc., Amersfoort, NE); DARCO® S 51 HF (from lignite, steam activated, powder); SHIRASAGI® DC-32 powered or granular carbon from wood, zinc chloride activated (Takeda Chemical Industries, Ltd., Osaka, JP); and various ColorSorb™ granular activated carbons from mineral or coconut shell, steam activated including, but not limited to, ColorSorb™ 5000, ColorSorb™ H150-LC, ColorSorb™ H620, ColorSorb™ HS, and ColorSorb™ HS-D (Jacobi Carbons France SASU). In some embodiments, that activated carbon used in the processes described herein can be prepared for use using the Carbon Preparation Process described below.

The loading ratio of activated carbon ultimately depends upon the amount or concentration of the alkylated cyclodextrin and impurities in solution as well as the physical properties of the activated carbon used. In general, the weight ratio of a cyclodextrin to activated carbon is 5:1 to 10:1, 6:1 to 9:1, 7:1 to 9:1, 8:1 to 9:1, 8.3:1 to 8.5:1, 8.4:1 to 8.5:1, or 8.44:1 by weight per treatment cycle.

As used herein, "treatment cycle" refers to a contacting a predetermined amount of a cyclodextrin composition with a predetermined amount of activated carbon. A treatment cycle can be performed as a single treatment or as a multiple (recycling) pass-through treatment. In some embodiments, the alkylated cyclodextrin solution obtained after diafiltration may be subjected to a treatment cycle wherein the alkylated cyclodextrin solution is passed through (recycled) through the activated carbon for 30 minutes, 1 hour, 2 hours, 3 hours, 4 hours, 5 hours, 6 hours, or more. In some embodiments, after the first treatment cycle is completed, the alkylated cyclodextrin solution may be subjected to a second treatment cycle wherein the alkylated cyclodextrin solution is passed through (recycled) through the activated carbon for 30 minutes, 1 hour, 2 hours, 3 hours, 4 hours, 5 hours, 6 hours, or more.

The alkylated cyclodextrin solution produced after carbon treatment may be further purified by nanofiltration through a nanofiltration membrane (106). Nanofiltration membranes generally have pore sizes ranging from 0.1 nm to 10 nm, where are smaller than those used in diafiltration and ultrafiltration. For example, nanofiltration membranes suitable for use in the processes of the present disclosure have pore sizes of 0.1 nm, 0.2 nm, 0.3 nm, 0.4 nm, 0.5 nm, 0.6 nm, 0.7 nm, 0.8 nm, 0.9 nm, 1.0 nm, 1.5 nm, 2.0 nm, 2.5 nm, 3.0 nm, 3.5 nm, 4.0 nm, 4.5 nm, 5.0 nm, 5.5 nm, 6.0 nm, 6.5 nm, 7.0 nm, 7.5 nm, 8.0 nm, 8.5 nm, 9.0 nm, 9.5 nm, or 10 nm, or within a range defined by any of the foregoing pore sizes, such as 1.0 to 10 nm, 1.0 nm to 5 nm, 0.1 nm to 5 nm, 0.5 nm to 5 nm, or 0.5 nm to 2.0 nm. The nanofiltration membranes suitable for use in the processes of the present disclosure generally have a MWCO of about 500 Da, for example, 150 Da to 500 Da, 200 Da to 500 Da, 300 Da to 500 Da, 300 Da to 600 Da, or 200 Da to 600 Da. In some embodiments, the nanfiltration membrane may have a MWCO of about 100 Da, 150 Da, 200 Da, 250 Da, 300 Da, 350 Da, 400 Da, 450 Da, 500 Da, 550 Da, or 600 Da.

The nanofiltration step may be conducted one or more times and for a period for anywhere between 30 minutes to about 24 hours, 30 minutes to 12 hours, 1 hour to 10 hours, 1 hour to 4 hours, 1 hour to 3 hours, or any other suitable period. For example, in some embodiments, the nanofiltration may be conducted for a period of 30 minute, 1 hour, 1.5 hours, 2 hours, 3, hours, 4 hours, 5 hours, 6 hours, 7 hours, 8 hours, 9 hours, 10 hours, 11 hours, 12 hours or more.

In some embodiments, nanofiltration results in an alkylated cyclodextrin solution that is more concentrated than the alkylated cyclodextrin solution obtained immediately after treatment with activated carbon. In some embodiments, the concentration of the alkylated cyclodextrin in the solution obtained after nanofiltration may be from about 10% (w/w) to about 30% (w/w), from about 10% (w/w) to about 25% (w/w), from about 15% (w/w) to about 30% (w/w), from about 15% (w/w) to about 25% (w/w), from about 15% (w/w) to about 20% (w/w), from about 18% (w/w) to about 25% (w/w), or from about 18% (w/w) to about 20% (w/w). For example, the concentration of the alkylated cyclodextrin in the solution obtained after nanofiltration may be about 10% (w/w), 11% (w/w), 12% (w/w), 13% (w/w), 14% (w/w), 15% (w/w), 16% (w/w), 17% (w/w), 18% (w/w), 19% (w/w), 20% (w/w), 21% (w/w), 22% (w/w), 23% (w/w), 24% (w/w), 25% (w/w), 26% (w/w), 27% (w/w), 28% (w/w), 29% (w/w), or 30% (w/w).

After nanofiltration is complete, the resulting alkylated cyclodextrin solution may be further concentrated to prepare for recovery of solid alkylated cyclodextrin (108). The alkylated cyclodextrin solution from the nanofiltration may be further concentrated to produce an alkylated cyclodextrin solution wherein the concentration of alkylated cyclodextrin is from about 30% (w/w) to about 70% (w/w), from about 40% (w/w) to about 60% (w/w), or about 50% (w/w). In some embodiments, the alkylated cyclodextrin solution resulting from the nanofiltration step is concentrated for a period of about 2 to about 24 hours, about 6 to about 18 hours, or about 8 to about 12 hours. In some embodiments, the alkylated cyclodextrin solution resulting from the nanofiltration step is concentrated for a period of about 2, 3, 4, 5, 6, 7, 8, 9, 10, 11, 12, 13, 14, 15, 16, 17, 18, 19, 20, 21, 22, 23, or 24 hours. In some embodiments, the alkylated cyclodextrin solution resulting from the nanofiltration step is concentrated by removing the solvent via distillation. In some embodiments, the alkylated cyclodextrin solution resulting from the nanofiltration step is concentrated by removing the solvent via lyophilization. In some embodiments, the alkylated cyclodextrin solution resulting from the nanofiltration step is concentrated using standard methods known in the art.

A final, solid alkylated cyclodextrin product can be isolated at this point by evaporation of the solvent (via, e.g., distillation, spray dying, lyophilization, and the like) (110). The final product produced by the instant disclosure advantageously contains very low residual levels of alkylating agent, e.g., less than 2 ppm based on the weight of the dry (i.e., containing less than 10% by weight water) final product, less than 1 ppm, less than 250 ppb, or essentially no residual alkylating agent. The final product containing less than 250 ppb of alkylating agent is accordingly provided as an additional feature of the disclosure. The alkylating agent can be reduced following completion of the alkylation to the desired degree of substitution by an alkaline hydrolysis treatment as previously described, i.e., by adding extra hydroxide solution in an amount and under conditions sufficient to reduce the amount of unreacted alkylating agent in the dry product to the desired level below 2 ppm, less than 1 ppm, or less than 250 ppb.

In some embodiments, the phosphate level of the solid alkylated cyclodextrin is less than 500 ppm, less than 200, less than 150 ppm, less than 125 ppm, less than 100 ppm, less than 95 ppm, less than 90 ppm, less than 85 ppm, less than 80 ppm, less than 75 ppm, less than 70 ppm, less than 65 ppm, less than 60 ppm, less than 55 ppm, less than 50 ppm, less than 45 ppm, less than 40 ppm, less than 35 ppm, less than 30 ppm, less than 25 ppm, less than 20 ppm, less than 15 ppm, less than 10 ppm, or less than 5 ppm. In some embodiments, the phosphate level in the solid alkylated cyclodextrin composition is 200 ppm to 5 ppm, 150 ppm to 5 ppm, 125 ppm to 5 ppm, 100 ppm to 5 ppm, 75 ppm to 5 ppm, 50 ppm to 5 ppm, 150 ppm to 10 ppm, 125 ppm to 10 ppm, 100 ppm to 10 ppm, or 75 ppm to 10 ppm.

In some embodiments, the compositions of the present invention are substantially free of one or more UV-active impurities. In some embodiments, the UV-active impurities may be a drug-degrading agent. The presence of one or more UV-active impurities can be determined, inter alia, by UV/visible ("UV/vis") spectrophotometry. As used herein, a "drug degrading agent" or "drug degrading impurity" refers to a species, moiety, and the like, that degrades certain active components in aqueous solution. It will be understood that a drug degrading agent may not degrade all drugs with which an alkylated cyclodextrin composition may be combined, depending on the chemical structure of the drug and its degradation pathways. In some embodiments, a drug-degrading species has an absorption in the UV/visible region of the spectrum, for example, an absorption maximum at a wavelength of 245 nm to 270 nm.

The alkylated cyclodextrin composition can be measured by UV/vis in absorbance units (A.U.). In some embodiments, the alkylated cyclodextrin composition has an absorption of less than 1 A.U., less than 0.9 A.U., less than 0.8 A.U., less than 0.7 A.U., less than 0.6 A.U., 0.5 A.U., less than 0.4 A.U., less than 0.3 A.U., less than 0.2 A.U., or less than 0.1 A.U. In some embodiments, the presence of UV-active agents in the composition can be measured by UV/vis in absorbance units.

The absorbance of the solution becomes linear with the concentration according to the formula:

$A = \varepsilon lc$ wherein

A=absorbance $\varepsilon$=extinction coefficient l=path length c=molar concentration.

The alkylated cyclodextrin composition can be measured using UV/vis spectrophotometry at a wavelength of 245 to 270 nm using a cell having a path length of 1 cm. In some embodiments, the alkylated cyclodextrin composition has an absorption of less than 1 A.U. at a wavelength of 245 nm to 270 nm for an aqueous solution containing 200 mg of the alkylated cyclodextrin composition per mL of solution, less than 1 A.U. at a wavelength of 245 nm to 270 nm for an aqueous solution containing 300 mg of the alkylated cyclodextrin composition per mL of solution, less than 1 A.U. at a wavelength of 245 nm to 270 nm for an aqueous solution containing 400 mg of the alkylated cyclodextrin composition per mL of solution, less than 1 A.U. at a wavelength of 245 nm to 270 nm for an aqueous solution containing 500 mg of the alkylated cyclodextrin composition per mL of solution, 0.9 A.U. or less at a wavelength of 245 nm to 270 nm for an aqueous solution containing 200 mg of the alkylated cyclodextrin composition per mL of solution, 0.9 A.U. or less at a wavelength of 245 nm to 270 nm for an aqueous solution containing 300 mg of the alkylated cyclodextrin composition per mL of solution, 0.9 A.U. or less at a wavelength of 245 nm to 270 nm for an aqueous solution containing 400 mg of the alkylated cyclodextrin composition per mL of solution, 0.9 A.U. or less at a wavelength of 245 nm to 270 nm for an aqueous solution containing 500 mg of the alkylated cyclodextrin composition per mL of solution, 0.8 A.U. or less at a wavelength of 245 nm to 270 nm for an aqueous solution containing 200 mg of the alkylated cyclodextrin composition per mL of solution, 0.8 A.U. or less at a wavelength of 245 nm to 270 nm for an aqueous solution containing 300 mg of the alkylated cyclodextrin composition per mL of solution, 0.8 A.U. or less at a wavelength of 245 nm to 270 nm for an aqueous solution containing 400 mg of the alkylated cyclodextrin composition per mL of solution, 0.8 A.U. or less at a wavelength of 245 nm to 270 nm for an aqueous solution containing 500 mg of the alkylated cyclodextrin composition per mL of solution, 0.7 A.U. or less at a wavelength of 245 nm to 270 nm for an aqueous solution containing 200 mg of the alkylated cyclodextrin composition per mL of solution, 0.7 A.U. or less at a wavelength of 245 nm to 270 nm for an aqueous solution containing 300 mg of the alkylated cyclodextrin composition per mL of solution, 0.7 A.U. or less at a wavelength of 245 nm to 270 nm for an aqueous solution containing 400 mg of the alkylated cyclodextrin composition per mL of solution, 0.7 A.U. or less at a wavelength of 245 nm to 270 nm for an aqueous solution containing 500 mg of the alkylated cyclodextrin composition per mL of solution, 0.6 A.U. or less at a wavelength of 245 nm to 270 nm for an aqueous solution containing 200 mg of the alkylated cyclodextrin composition per mL of solution, 0.6 A.U. or less at a wavelength of 245 nm to 270 nm for an aqueous solution containing 300 mg of the alkylated cyclodextrin composition per mL of solution, 0.6 A.U. or less at a wavelength of 245 nm to 270 nm for an aqueous solution containing 400 mg of the alkylated cyclodextrin composition per mL of solution, 0.6 A.U. or less at a wavelength of 245 nm to 270 nm for an aqueous solution containing 500 mg of the alkylated cyclodextrin composition per mL of solution, 0.5 A.U. or less at a wavelength of 245 nm to 270 nm for an aqueous solution containing 200 mg of the alkylated cyclodextrin composition per mL of solution, 0.5 A.U. or less at a wavelength of 245 nm to 270 nm for an aqueous solution containing 300 mg of the alkylated cyclodextrin composition per mL of solution, 0.5 A.U. or less at a wavelength of 245 nm to 270 nm for an aqueous solution containing 400 mg of the alkylated cyclodextrin composition per mL of solution, 0.5 A.U. or less at a wavelength of 245 nm to 270 nm for an aqueous solution containing 500 mg of the alkylated cyclodextrin composition per mL of solution, 0.4 A.U. or less at a wavelength of 245 nm to 270 nm for an aqueous solution containing 200 mg of the alkylated cyclodextrin composition per mL of solution, 0.4 A.U. or less at a wavelength of 245 nm to 270 nm for an aqueous solution containing 300 mg of the alkylated cyclodextrin composition per mL of solution, 0.4 A.U. or less at a wavelength of 245 nm to 270 nm for an aqueous solution containing 400 mg of the alkylated cyclodextrin composition per mL of solution, 0.4 or less A.U. at a wavelength of 245 nm to 270 nm for an aqueous solution containing 500 mg of the alkylated cyclodextrin composition per mL of solution, 0.3 A.U. or less at a wavelength of 245 nm to 270 nm for an aqueous solution containing 200 mg of the alkylated cyclodextrin composition, 0.3 A.U. or less at a wavelength of 245 nm to 270 nm for an aqueous solution containing 300 mg of the alkylated cyclodextrin composition per mL of solution, 0.3 A.U. or less at a wavelength of 245 nm to 270 nm for an aqueous solution containing 400 mg of the alkylated cyclodextrin composition per mL of solution, 0.3 A.U. or less at a wavelength of 245 nm to 270 nm for an aqueous solution containing 500 mg of the alkylated cyclodextrin composition per mL of solution, 0.2 A.U. or less at a wavelength of 245 nm to 270 nm for an aqueous solution containing 200 mg of the alkylated cyclodextrin composition per mL of solution, 0.2 A.U. or less at a wavelength of 245 nm to 270 nm for an aqueous solution containing 300 mg of the alkylated cyclodextrin composition per mL of solution, 0.2 A.U. or less at a wavelength of 245 nm to 270 nm for an aqueous solution containing 400 mg of the alkylated cyclodextrin composition per mL of solution, or 0.2 A.U. or less at a wavelength of 245 nm to 270 nm for an aqueous solution containing 500 mg of the alkylated cyclodextrin composition per mL of solution. In some embodiments, the presence of impurities in the alkylated cyclodextrin compositions can be measured by UV/vis in absorbance units.

The impurities components can include, but are not limited to, low molecular weight impurities (i.e., impurities having a molecular weight of about 500 Da or less), water-soluble and/or water-insoluble ions (i.e., salts), hydrolyzed sulfoalkylating agent, 5-(hydroxymethyl)-2-furaldehyde, unreacted cyclodextrin starting material, degraded cyclodextrin species (e.g., degraded and/or ring-opened species formed from unreacted cyclodextrin, partially reacted cyclodextrin, and/or SAE-CD), unreacted alkylating agent (e.g., 1,4-butane sultone), and combinations thereof.

Not being bound by any particular theory, a UV-active agent, species, or moiety can include one or more low-molecular weight species (e.g., a species having a molecular weight less than 1,000 Da), such as, but not limited to a species generated as a side-product and/or decomposition product in the reaction mixture. As such, UV-active species include, but are not limited to, a glycosidic moiety, a ring-opened cyclodextrin species, a reducing sugar, a glucose degradation product (e.g., 3,4-dideoxyglucosone-3-ene, carbonyl-containing degradants such as 2-furaldehyde, 5-hydroxymethyl-2-furaldehyde and the like), and combinations thereof.

In some embodiments, the solid alkylated cyclodextrin comprises less than 1% wt., less than 0.5% wt., less than 0.2% wt., less than 0.1% wt., less than 0.09% wt., less than 0.08% wt., less than 0.07% wt., less than 0.06% wt., less than 0.05% wt., less than 0.04% wt., less than 0.03% wt., less than 0.02% wt., less than 0.01% wt., less than 0.009% wt., less than 0.008% wt., less than 0.007% wt., less than 0.005% wt., or less than 0.002% wt. of an alkali metal halide salt.

In some embodiments, the solid alkylated cyclodextrin comprises less than 1% wt., less than 0.5% wt., less than 0.2% wt., less than 0.1% wt., less than 0.09% wt., less than 0.08% wt., less than 0.07% wt., less than 0.06% wt., less than 0.05% wt., less than 0.04% wt., less than 0.03% wt., less than 0.02% wt., less than 0.01% wt., less than 0.009% wt., less than 0.008% wt., less than 0.007% wt., less than 0.005% wt., or less than 0.002% wt. of chloride.

In some embodiments, the solid alkylated cyclodextrin comprises less than 1% wt., less than 0.5% wt., less than 0.25% wt., less than 0.1% wt., less than 0.08% wt., or less than 0.05% wt. of a hydrolyzed alkylating agent.

In some embodiments, the solid alkylated cyclodextrin comprises less than 500 ppm, less than 100 ppm, less than 50 ppm, less than 20 ppm, less than 10 ppm, less than 5 ppm, less than 2 ppm, less than 1 ppm, less than 500 ppb, or less than 250 ppb of an alkylating agent.

In some embodiments, the solid alkylated cyclodextrin comprises less than 0.5% wt., less than 0.2% wt., less than 0.1% wt., or less than 0.08% wt. of underivatized cyclodextrin.

The chloride level of the alkylated cyclodextrin can be determined using any method commonly used by one of skill in the art. In some embodiments, the chloride level is measured using charged aerosol detection (CAD). In some embodiments, the chloride level is measured using ion chromatography.

In some embodiments, the chloride level as measured by weight ratio (w/w) of the alkylated cyclodextrin is 1% or less, 0.9% or less, 0.8% or less, 0.7% or less, 0.6% or less, 0.5% or less, 0.4% or less, 0.3% or less, 0.2% or less, 0.1% or less, 0.09% or less, 0.08% or less, 0.07% or less, 0.06% or less, 0.05% or less, 0.04% or less, 0.03% or less, 0.02% or less, 0.01% or less, 0.009% or less, 0.008% or less, 0.007% or less, 0.006% or less, 0.005% or less, 0.004% or less, 0.003% or less, or 0.002% or less. In some embodiments, the chloride level in the alkylated cyclodextrin is 1% to 0.002%, 0.9% to 0.002%, 0.8% to 0.002%, 0.7% to 0.002%, 0.6% to 0.002%, 0.5% to 0.002%, 0.4% to 0.002%, 0.3% to 0.002%, 0.2% to 0.002%, 0.1% to 0.002%, 0.09% to 0.002%, 0.08% to 0.002%, 0.07% to 0.002%, 0.06% to 0.002%, 0.05% to 0.002%, 0.04% to 0.002%, 0.03% to 0.002%, 0.02% to 0.002%, 0.01% to 0.002%, 0.009% to 0.002%, 0.008% to 0.002%, 0.007% to 0.002%, 0.006% to 0.002%, 0.005% to 0.002%. 0.004% to 0.002%, or 0.003% to 0.002%.

The final yield of the alkylated cyclodextrin (in isolated and/or purified or partially purified form) obtained at completion of the process will vary. The final yield of alkylated cyclodextrin based on the cyclodextrin starting material can range from 10% to 95%, 15% to 90%, 20% to 85%, 30% to 85%, 35% to 85%, 40% to 85%, 45% to 80%, 50% to 80%, 55% to 80%, 60% to 80%, 50% to 90%, 55% to 90%, 60% to 90%, 70% to 90%, 80% to 90%, 60% to 98%, 70% to 98%, 80% to 98%, or 90% to 98%. In some embodiments, the final yield of alkylated cyclodextrin based on the cyclodextrin starting material is 80% or greater, 85% or greater, 90% or greater, or 95% or greater.

The processes of the instant disclosure are suitable for large-scale production and purification of alkylated cyclodextrin and present a marked increase from previously known processes. The processes described herein may be used to prepare single batches of alkylated cyclodextrin using greater than 275 kg of a starting cyclodextrin (e.g., α-cyclodextrin, β-cyclodextrin, or 7-cyclodextrin). In some embodiments, the starting cyclodextrin is β-cyclodextrin. In some embodiments, the processes described can be used to prepare a single batch of alkylated cyclodextrin using greater than 300 kg, greater than 325 kg, greater than 350 kg, greater than 375 kg or greater than 400 kg of a starting cyclodextrin. In some embodiments, the amount of starting cyclodextrin is about 300 kg to about 400 kg, about 325 kg to about 375 kg, about 325 kg to about 400 kg. In some embodiments, the amount of starting cyclodextrin is about 350 kg Carbon Preparation Process As discussed above, the purification of the crude alkylated cyclodextrin disclosed herein may utilize a carbon purification step to remove impurities generated during the synthesis of the alkylated cyclodextrin. For example, such a purification process was disclosed in U.S. Pat. No. 6,153,746, the contents of which are incorporated herein in their entirety. Improvements to the carbon preparation process are described in U.S. Pat. No. 7,635,773, where the activated carbon is washed until a constant conductivity is reached prior to purification of the crude alkylated cyclodextrin. While the carbon preparation process described in U.S. Pat. No. 7,635,773 removed some impurities, a high amount of chloride in the alkylated cyclodextrin product remained. The chloride impurities may react with an active agent and cause degradation of the active agent.

Further improvements to the carbon preparation process disclosed in U.S. Pat. No. 9,493,582, wherein the carbon preparation process included washing the carbon until a conductivity level of 10 µS/cm is reached. U.S. Pat. No. 10,040,872 discloses a method of preparing the carbon that includes a soaking step. While the methods described in these applications reduce the amount of chloride impurities in the final alkylated cyclodextrin product, it is desirable to further reduce the chloride levels in the alkylated cyclodextrin product, in particular when the active agent is sensitive to chloride. The methods disclosed herein further reduce the chloride levels in the alkylated cyclodextrin product.

The conductivity of the activated carbon's water wash eluent can be determined using any method commonly used by one of skill in the art. In some embodiments, the conductivity is measured using a conductivity meter. In some embodiments, the conductivity is measured using ion chromatography.

In some embodiments, the conductivity of the activated carbon's water wash eluent is measured before addition of alkylated cyclodextrin solution that has been previously partially purified by diafiltration. In some embodiments, the conductivity of the activated carbon's water wash eluent is measured after a water wash of the activated carbon. In some embodiments, the conductivity of the activated carbon's water wash eluent is measured after flowing water over the carbon. In some embodiments, the conductivity of the activated carbon's water wash eluent prior to treating the partially purified alkylated cyclodextrin solution with the activated carbon to produce a final purified alkylated cyclodextrin composition is 35 µS/cm or less, 34 µS/cm or less, 33 µS/cm or less, 32 µS/cm or less, 31 µS/cm or less, 30 µS/cm or less, 29 µS/cm or less, 28 µS/cm or less, 27 µS/cm or less, 26 µS/cm or less, 25 µS/cm or less, 24 µS/cm, 23 µS/cm or less, 22 µS/cm or less, 21 µS/cm or less, 20 µS/cm or less, 19 µS/cm or less, 18 µS/cm or less, 17 µS/cm or less, 16 µS/cm or less, 15 µS/cm or less, 14 µS/cm or less, 13 µS/cm or less, 12 µS/cm or less, 11 µS/cm or less, 10 µS/cm or less, 9 µS/cm or less, 8 µS/cm or less, 7 µS/cm or less, 6 µS/cm or less, 5 µS/cm or less, 4 µS/cm or less, 3 µS/cm or less, 2 µS/cm or less, or 1 µS/cm or less. In some embodiments, the conductivity of the activated carbon's water wash eluent prior to addition of the partially purified alkylated cyclodextrin solution is 10 µS/cm to 15 µS/cm, 5 µS/cm to 15 µS/cm, 5 µS/cm to 10 µS/cm, 4 µS/cm to 10 µS/cm, 3 µS/cm to 10 µS/cm, or 4 µS/cm to 8 µS/cm.

In some embodiments, the activated carbon is washed 1, 2, 3, 4, 5, 6, 7, 8, 9, 10, 11, 12, 13, 14, or 15 times before treating the partially purified alkylated cyclodextrin solution with activated carbon. In some embodiments, the activated carbon is washed 1 or more, 2 or more, 3 or more, 4 or more, 5 or more, 6 or more, 7 or more, 8 or more, 9 or more, or 10 or more times before treating the partially purified alkylated cyclodextrin solution with activated carbon.

Even when the activated carbon in the column is washed with water there may be an inadequate wetting of the activated carbon. In the wash procedure there is no way to control for channeling through the carbon bed. It is believed that by more thoroughly washing the carbon before circulating the alkylated cyclodextrin solution it will reduce or remove all further addition of residual chloride from the alkylated cyclodextrin composition product.

In some embodiments, the activated carbon is added to a dedicated tank system with an agitator and screen system. The activated carbon is charged followed by a first carbon washing with several portions of water at a determined agitation rate for a determined time period. Following the water wash, the water layer is removed from the dedicated tank and additional water washes occur. After additional water washes the conductivity of the activated carbon is determined and when the conductivity is below a predetermined level the carbon is suspended in water and the carbon/water slurry is pumped into a column for further treatment. The activated carbon would then be ready for flowing water over the carbon or for further treatment comprising the step of adding a portion of the partially purified solution comprising the alkylated cyclodextrin to the carbon, soaking the carbon in the partially purified solution and eluting and discarding the solution. The predetermined level of conductivity can be, for example, 35 µS/cm or less, 34 µS/cm or less, 33 µS/cm or less, 32 µS/cm or less, 31 µS/cm or less, 30 µS/cm or less, 29 µS/cm or less, 28 µS/cm or less, 27 µS/cm or less, 26 µS/cm or less, 25 µS/cm or less, 24 µS/cm, 23 µS/cm or less, 22 µS/cm or less, 21 µS/cm or less, 20 µS/cm or less, 19 µS/cm or less, 18

μS/cm or less, 17 μS/cm or less, 16 μS/cm or less, 15 μS/cm or less, 14 μS/cm or less, 13 μS/cm or less, 12 μS/cm or less, 11 μS/cm or less, 10 μS/cm or less, 9 μS/cm or less, 8 μS/cm or less, 7 μS/cm or less, 6 μS/cm or less, 5 μS/cm or less, 4 μS/cm or less, 3 μS/cm or less, 2 μS/cm or less, or 1 μS/cm or less. In some embodiments, the desired conductivity level may be attained after about 6 to 12 hours of water washes.

The agitation can be measured in revolutions per minute (rpm). In some embodiments, the agitation rate can range, for example, from 5 rpm to 300 rpm. For example, the agitation rate can be 5 rpm, 10 rpm, 20 rpm, 30 rpm, 40 rpm, 50 rpm, 60 rpm, 70 rpm, 80 rpm, 90 rpm, or 100 rpm. The agitation time can range from 1 minute to 5 days. The agitation time can be, for example, 5 minutes, 10 minutes, 20 minutes, 30 minutes, 40 minutes, 50 minutes, 60 minutes, 2 hours, 3 hours, 4 hours, 5 hours, 6 hours, 7 hours, 8 hours, 9 hours, 10 hours, 11 hours, 12 hours, 24 hours, 2 days, 3 days, or 4 days. In some embodiments, the agitation time is 5 minutes to 1 hour, 5 minutes to 2 hours, 5 minutes to 3 hours, 5 minutes to 4 hours, 5 minutes to 5 hours, 10 minutes to 1 hour, 10 minutes to 2 hours, 10 minutes to 3 hours, 10 minutes to 4 hours, 20 minutes to 1 hour, 20 minutes to 2 hours, 20 minutes to 3 hours, 20 minutes to 4 hours, 30 minutes to 1 hour, 30 minutes to 2 hours, 30 minutes to 3 hours, or 30 minutes to 4 hours.

In some embodiments, the tank system is maintained at room temperature (25° C.) during the water washing process. In some embodiments, the tank system can be heated during the water washing process. In some embodiments, the temperature can range, for example, from 30° C. to 100° C. For example, the cooling temperature can be 30° C., 40° C., 50° C., 60° C., 70° C., 80° C., 90° C., or 100° C. The heating time can range from 1 minute to 5 days. The heating time can be, for example, 5 minutes to 4 days, 5 minutes to 60 minutes, 10 minutes to 50 minutes, 20 minutes to 40 minutes, 30 minutes to 60 minutes, 2 hours to 24 hours, 3 hours to 12 hours, 4 hours to 10 hours, 5 hours to 9 hours, 6 hours to 8 hours, 2 days to 4 days, or 3 days to 4 days. In some embodiments, the heating time is 5 minutes to 1 hour, 5 minutes to 2 hours, 5 minutes to 3 hours, 5 minutes to 4 hours, 5 minutes to 5 hours, 10 minutes to 1 hour, 10 minutes to 2 hours, 10 minutes to 3 hours, 10 minutes to 4 hours, 20 minutes to 1 hour, 20 minutes to 2 hours, 20 minutes to 3 hours, 20 minutes to 4 hours, 30 minutes to 1 hour, 30 minutes to 2 hours, 30 minutes to 3 hours, or 30 minutes to 4 hours.

In some embodiments, the carbon transferred to the column may be subjected to a further washing process. The further washing process may comprise flowing water over the activated carbon. In some embodiments, the column may be filled with purified water from top to bottom or bottom to top and held in the column for a period of time. In some embodiments the water is held in the column for at least thirty minutes. In some embodiments the water is held in the column for 30 to 45 minutes. Purified water is then flowed over the activated carbon and discharged. In some embodiments, the purified water is flowed in the same direction that the water was filled in the first carbon washing process. In other embodiments, the water is flowed over the activated carbon in a different direction than the water was filled in the first carbon washing process. For example, in some embodiments, the water may be filled in the first carbon washing process in a top to bottom and the water may be flowed over the activated carbon in the second carbon washing process in a top to bottom direction. In some embodiments, the water may be filled in the first carbon washing process in a top to bottom direction and the water may be flowed over the activated carbon in the second carbon washing process in a bottom to top direction. In some embodiments, the water may be filled in the first carbon washing process in a bottom to top direction and the water may be flowed over the activated carbon in the second carbon washing process in a top to bottom direction.

Water may be flowed over the activated carbon for a set amount of time. For example, water can be flowed over the activated carbon for at least 10 minutes, 20 minutes, 30 minutes, 40 minutes, 50 minutes, 60 minutes, 70 minutes, 80 minutes, 90 minutes, 100 minutes, 110 minutes, 120 minutes, 150 minutes, 180 minutes, 210 minutes, 240 minutes, 270 minutes, 300 minutes, 330 minutes, 360 minutes, 390 minutes, 420 minutes, 450 minutes, 480 minutes, or more. For example, water may be flowed over the activated carbon for about 1 hour, about 2 hours, about 3 hours, about 4 hours, or about 5 hours. The water may be flowed over the activated carbon at a flow rate of at least 50 liters per hour, 100 liters per hour, 150 liters per hour, 200 liters per hour, 250 liters per hour, 300 liters per hour, 350 liters per hour, 400 liters per hour, 450 liters per hour, 500 liters per hour, or more. For example, water may be flowed over the activated carbon for about 100 liters per hour, about 200 liters per hour, about 300 liters per hour, about 400 liters per hour, about 500 liters per hour, about 600 liters per hour, about 700 liters per hour, about 800 liters per hour, about 900 liters per hour, or about 1,000 liters per hour. After flowing water over the carbon, the columns may then be flushed with purified water from the top of the column for 30 minutes and then drained from the column.

In some embodiments, the activated carbon subjected to a further carbon washing process comprising adding a portion of the partially purified alkylated cyclodextrin solution to the activated carbon, soaking the activated carbon in the partially purified alkylated cyclodextrin solution, and eluting and discarding the partially purified alkylated cyclodextrin solution. The alkylated cyclodextrin solution may be filled in a top to bottom direction or a bottom to top direction. In an embodiment, the activated carbon is allowed to soak for a set amount of time before the partially purified alkylated cyclodextrin solution is eluted. For example, the activated carbon can soak for at least 10 minutes, 20 minutes, 30 minutes, 40 minutes, 50 minutes, 60 minutes, 70 minutes, 80 minutes, 90 minutes, 100 minutes, 110 minutes, 120 minutes, 150 minutes, 180 minutes, 210 minutes, 240 minutes, 270 minutes, 300 minutes, 330 minutes, 360 minutes, 390 minutes, 420 minutes, 450 minutes, 480 minutes, or more. In one embodiment, the activated carbon is allowed to soak for at least 120 minutes.

In some embodiments, the carbon may be agitated during the soaking process at a rate between, for example, from 5 rpm to 300 rpm. For example, the agitation rate can be 5 rpm, 10 rpm, 20 rpm, 30 rpm, 40 rpm, 50 rpm, 60 rpm, 70 rpm, 80 rpm, 90 rpm, or 100 rpm. In some embodiments, the agitation rate may be bout 40-50 rpm.

In some embodiments, the temperature can range for the soaking of the carbon in the alkylated cyclodextrin solution, from 5° C. to 100° C. For example, the soaking temperature can be 10° C., 20° C., 25° C., 30° C., 40° C., 50° C., 60° C., 70° C., 80° C., 90° C., or 100° C. In some embodiments, the soaking temperature is room temperature.

In some embodiments, the activated carbon may subjected to yet a further carbon washing process after the soaking process. This further washing process comprises filling the column with purified water and letting the water sit for a period of time. In some embodiments, the water is added in a top to bottom direction. In other embodiments, the water is added in a bottom to top direction. In some embodiments, the water may be allowed to sit for about 30 minutes. The purified water is then drained from the bottom of the column. This process may be continued for at least one hour and the conductivity of the activated carbon is determined. When the conductivity is below a desired predetermined level, the column may be charged with water and used in the purification of the alkylated cyclodextrin. If the conductivity is above a desired predetermined level, this further washing process may be repeated. The predetermined level of conductivity can be, for example, 35 μS/cm or less, 34 μS/cm or less, 33 μS/cm or less, 32 μS/cm or less, 31 μS/cm or less, 30 μS/cm or less, 29 μS/cm or less, 28 μS/cm or less, 27 μS/cm or less, 26 μS/cm or less, 25 μS/cm or less, 24 μS/cm, 23 μS/cm or less, 22 μS/cm or less, 21 μS/cm or less, 20 μS/cm or less, 19 μS/cm or less, 18 μS/cm or less, 17 μS/cm or less, 16 μS/cm or less, 15 μS/cm or less, 14 μS/cm or less, 13 μS/cm or less, 12 μS/cm or less, 11 μS/cm or less, 10 μS/cm or less, 9 μS/cm or less, 8 μS/cm or less, 7 μS/cm or less, 6 μS/cm or less, 5 μS/cm or less, 4 μS/cm or less, 3 μS/cm or less, 2 μS/cm or less, or 1 μS/cm or less. In some embodiments, the predetermined level of conductivity is 10 μS/cm or less.

Uses of Alkylated Cyclodextrin Compositions

Among other uses, an alkylated cyclodextrin of the present disclosure can be used to solubilize and/or stabilize a variety of different materials and to prepare formulations for particular applications. The alkylated cyclodextrin described herein can provide enhanced solubility and/or enhanced chemical, thermochemical, hydrolytic and/or photochemical stability of other ingredients in a composition. For example, an alkylated cyclodextrin can be used to stabilize an active agent in an aqueous medium. An alkylated cyclodextrin can also be used to increase the solubility of an active agent in an aqueous medium.

The alkylated cyclodextrin composition of the present disclosure includes one or more active agents. The one or more active agents included in the composition of the present disclosure can possess a wide range of water solubility, bioavailability and hydrophilicity. Active agents to which the present disclosure is particularly suitable include water insoluble, poorly water-soluble, slightly water-soluble, moderately water-soluble, water-soluble, very water-soluble, hydrophobic, and/or hydrophilic therapeutic agents. It will be understood by a person of ordinary skill in the art one or more active agents present in a composition of the present disclosure is independently selected at each occurrence from any known active agent and from those disclosed herein. It is not necessary that the one or more active agents form a complex with the alkylated cyclodextrin, or form an ionic association with the alkylated cyclodextrin.

Active agents generally include physiologically or pharmacologically active substances that produce a systemic or localized effect or effects on animals and human beings. Active agents also include pesticides, herbicides, insecticides, antioxidants, plant growth instigators, sterilization agents, catalysts, chemical reagents, food products, nutrients, cosmetics, vitamins, sterility inhibitors, fertility instigators, microorganisms, flavoring agents, sweeteners, cleansing agents, pharmaceutically effective active agents, and other such compounds for pharmaceutical, veterinary, horticultural, household, food, culinary, agricultural, cosmetic, industrial, cleaning, confectionery and flavoring applications. The active agent can be present in its neutral, ionic, salt, basic, acidic, natural, synthetic, diastereomeric, isomeric, enantiomerically pure, racemic, hydrate, chelate, derivative, analog, or other common form.

Representative pharmaceutically effective active agents include nutrients and nutritional agents, hematological agents, endocrine and metabolic agents, cardiovascular agents, renal and genitourinary agents, respiratory agents, central nervous system agents, gastrointestinal agents, antifungal agents, anti-infective agents, biologic and immunological agents, dermatological agents, ophthalmic agents, antineoplastic agents, and diagnostic agents. Exemplary nutrients and nutritional agents include as minerals, trace elements, amino acids, lipotropic agents, enzymes and chelating agents. Exemplary hematological agents include hematopoietic agents, antiplatelet agents, anticoagulants, coumarin and indandione derivatives, coagulants, thrombolytic agents, antisickling agents, hemorrheologic agents, antihemophilic agents, hemostatics, plasma expanders and hemin. Exemplary endocrine and metabolic agents include sex hormones, uterine-active agents, bisphosphonates, antidiabetic agents, glucose elevating agents, corticosteroids, adrenocortical steroids, parathyroid hormone, thyroid drugs, growth hormones, posterior pituitary hormones, octreotide acetate, imiglucerase, calcitonin-salmon, sodium phenylbutyrate, betaine anhydrous, cysteamine bitartrate, sodium benzoate and sodium phenylacetate, bromocriptine mesylate, cabergoline, agents for gout, and antidotes. Antifungal agents suitable for use with the alkylated cyclodextrin composition of the present disclosure include, but are not limited to, posaconazole, voriconazole, clotrimazole, ketoconazole, oxiconazole, sertaconazole, tetconazole, fluconazole, itraconazole and miconazole. Antipsychotic agents suitable for use with the alkylated cyclodextrin composition of the present disclosure include, but are not limited to, clozapine, prochlorperazine, haloperidol, thioridazine, thiothixene, risperidone, trifluoperazine hydrochloride, chlorpromazine, aripiprazole, loxapine, loxitane, olanzapine, quetiapine fumarate, risperidone and ziprasidone.

Exemplary cardiovascular agents include nootropic agents, antiarrhythmic agents, calcium channel blocking agents, vasodilators, antiadrenergics/sympatholytics, renin angiotensin system antagonists, antihypertensive agent combinations, agents for pheochromocytoma, agents for hypertensive emergencies, antihyperlipidemic agents, antihyperlipidemic combination products, vasopressors used in shock, potassium removing resins, edetate disodium, cardioplegic solutions, agents for patent ductus arteriosus, and sclerosing agents. Exemplary renal and genitourinary agents include interstitial cystitis agents, cellulose sodium phosphate, antiimpotence agents, acetohydroxamic acid (aha), genitourinary irrigants, cystine-depleting agents, urinary alkalinizers, urinary acidifiers, anticholinergics, urinary cholinergics, polymeric phosphate binders, vaginal preparations, and diuretics. Exemplary respiratory agents include bronchodilators, leukotriene receptor antagonists, leukotriene formation inhibitors, respiratory inhalant products, nasal decongestants, respiratory enzymes, lung surfactants, antihistamines, nonnarcotic antitussives, and expectorants. Exemplary central nervous system agents include CNS stimulants, narcotic agonist analgesics, narcotic agonist-antagonist analgesics, central analgesics, acetaminophen, salicylates, nonnarcotic analgesics, nonsteroidal anti-inflammatory agents, agents for migraine, antiemetic/antivertigo agents, antianxiety agents, antidepressants, antipsychotic agents, cholinesterase inhibitors, nonbarbiturate sedatives and hypnotics, nonprescription sleep aids, barbiturate sedatives and hypnotics, general anesthetics, injectable local anesthetics, anticonvulsants, muscle relaxants, antiparkinson agents, adenosine phosphate, cholinergic muscle stimulants, disulfuram, smoking deterrents, riluzole, hyaluronic acid derivatives, and botulinum toxins. Exemplary gastrointestinal agents including *H. pylori* agents, histamine H2 antagonists, proton pump inhibitors, sucralfate, prostaglandins, antacids, gastrointestinal anticholinergics/antispasmodics, mesalamine, olsalazine sodium, balsalazide disodium, sulfasalazine, celecoxib, infliximab, tegaserod maleate, laxatives, antidiarrheals, antiflatulents, lipase inhibitors, GI stimulants, digestive enzymes, gastric acidifiers, hydrocholeretics, gallstone solubilizing agents, mouth and throat products, systemic deodorizers, and anorectal preparations. Exemplary anti-infective agents including penicillins, cephalosporins and related antibiotics, carbapenem, monobactams, chloramphenicol, quinolones, fluoroquinolones, tetracyclines, macrolides, spectinomycin, streptogramins, vancomycin, oxalodinones, lincosamides, oral and parenteral aminoglycosides, colistimethate sodium, polymyxin b sulfate, bacitracin, metronidazole, sulfonamides, nitrofurans, methenamines, folate antagonists, antifungal agents, antimalarial preparations, antituberculosis agents, amebicides, antiviral agents, antiretroviral agents, leprostatics, antiprotozoals, anthelmintics, and cdc anti-infective agents. Exemplary biologic and immunological agents including immune globulins, monoclonal antibody agents, antivenins, agents for active immunization, allergenic extracts, immunologic agents, and antirheumatic agents. Exemplary dermatological agents include topical antihistamine preparations, topical anti-infectives, anti-inflammatory agents, anti-psoriatic agents, antiseborrheic products, arnica, astringents, cleansers, capsaicin, destructive agents, drying agents, enzyme preparations, topical immunomodulators, keratolytic agents, liver derivative complex, topical local anesthetics, minoxidil, eflornithine hydrochloride, photochemotherapy agents, pigment agents, topical poison ivy products, topical pyrimidine antagonist, pyrithione zinc, retinoids, rexinoids, scabicides/pediculicides, wound healing agents, emollients, protectants, sunscreens, ointment and lotion bases, rubs and liniments, dressings and granules, and physiological irrigating solutions. Exemplary ophthalmic agents include agents for glaucoma, mast cell stabilizers, ophthalmic antiseptics, ophthalmic phototherapy agents, ocular lubricants, artificial tears, ophthalmic hyperosmolar preparations, and contact lens products. Exemplary antineoplastic agents include alkylating agents, antimetabolites, antimitotic agents, epipodophyllotoxins, antibiotics, hormones, enzymes, radiopharmaceuticals, platinum coordination complex, anthracenedione, substituted ureas, methylhydrazine derivatives, imidazotetrazine derivatives, cytoprotective agents, DNA topoisomerase inhibitors, biological response modifiers, retinoids, rexinoids, monoclonal antibodies, protein-tyrosine kinase inhibitors, porfimer sodium, mitotane (o, p'-ddd), and arsenic trioxide. Exemplary diagnostic agents include in vivo diagnostic aids, in vivo diagnostic biologicals, and radiopaque agents.

Exemplary active agents also include compounds that are sensitive to chloride levels. Exemplary chloride sensitive active agents include proteasome inhibitors such as bortezomib, disulfiram, epigallocatchin-3-gallate, salinosporamide A, and carfilzomib.

The above-listed active agents should not be considered exhaustive and is merely exemplary of the many embodiments considered within the scope of the disclosure. Many other active agents can be administered with the formulation of the present disclosure.

A formulation of the disclosure can be used to deliver two or more different active agents. Particular combinations of active agents can be provided in a formulation of the disclosure. Some combinations of active agents include: 1) a first drug from a first therapeutic class and a different second drug from the same therapeutic class; 2) a first drug from a first therapeutic class and a different second drug from a different therapeutic class; 3) a first drug having a first type of biological activity and a different second drug having about the same biological activity; and 4) a first drug having a first type of biological activity and a different second drug having a different second type of biological activity. Exemplary combinations of active agents are described herein.

An active agent contained within a formulation of the disclosure can be present as its pharmaceutically acceptable salt. As used herein, "pharmaceutically acceptable salt" refers to derivatives of the disclosed compounds wherein the active agent is modified by reacting it with an acid and/or base as needed to form an ionically bound pair. Examples of pharmaceutically acceptable salts include conventional non-toxic salts or the quaternary ammonium salts of a compound formed, for example, from non-toxic inorganic or organic acids. Suitable non-toxic salts include those derived from inorganic acids such as hydrochloric, hydrobromic, sulfuric, sulfonic, sulfamic, phosphoric, nitric and others known to those of ordinary skill in the art. The salts prepared from organic acids such as amino acids, acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, isethionic, and others known to those of ordinary skill in the art. Pharmaceutically acceptable salts suitable for use with the present disclosure can be prepared using an active agent that includes a basic or acidic group by conventional chemical methods. Suitable addition salts are found in *Remington's Pharmaceutical Sciences* (17th ed., Mack Publishing Co., Easton, P A, 1985), the relevant disclosure of which is hereby incorporated by reference in its entirety.

The present disclosure is also directed to a method for stabilizing an active agent, the method comprising providing an alkylated cyclodextrin composition comprising an alkylated cyclodextrin described herein; and combining the alkylated cyclodextrin composition with an active agent.

The method of stabilizing an active agent can be performed wherein the composition comprising one or more active agents and an alkylated cyclodextrin composition comprising an alkylated cyclodextrin is present as a dry solution, a wet solution, an inhalable composition, a parenteral composition, a solid solution, a solid mixture, a granulate, a gel, and other active agent compositions known to persons of ordinary skill in the art.

In some embodiments, the method of stabilizing an active agent provides an active agent assay of 98% or more, 98.5% or more, 99% or more, or 99.5% or more of the active agent after the composition comprising one or more active agents and an alkylated cyclodextrin composition is maintained at a temperature of 80° C. for a period of 120 minutes.

In some embodiments, the method of stabilizing provides an alkylated cyclodextrin composition comprising an alkylated cyclodextrin with a phosphate level of less than 400 ppm, less than 300 ppm, less than 200 ppm, less than 125 ppm, less than 100 ppm, less than 75 ppm, or less than 50 ppm.

In some embodiments, the method of stabilizing provides an alkylated cyclodextrin composition comprising an alkylated cyclodextrin wherein the alkylated cyclodextrin composition has an absorption of 0.5 A.U. or less, as determined by UV/vis spectrophotometry at a wavelength of 245 nm to 270 nm for an aqueous solution containing 300 mg of the alkylated cyclodextrin composition per mL of solution in a cell having a 1 cm path length. In some embodiments, said absorption of 0.5 A.U. or less is due to a drug degrading agent.

Generally, the alkylated cyclodextrin is present in an amount sufficient to stabilize the active agent. An amount sufficient can be a molar ratio of 0.1:1 to 10:1, 0.5:1 to 10:1, 0.8:1 to 10:1, or 1:1 to 5:1 (alkylated cyclodextrin:active agent).

A cyclodextrin in the combination composition need not bind with another material, such as an active agent, present in a formulation containing it. However, if a cyclodextrin binds with another material, such a bond can be formed as a result of an inclusion complexation, an ion pair formation, a hydrogen bond, and/or a Van der Waals interaction.

An anionic derivatized cyclodextrin can complex or otherwise bind with an acid-ionizable agent. As used herein, the term acid-ionizable agent is taken to mean any compound that becomes or is ionized in the presence of an acid. An acid-ionizable agent comprises at least one acid-ionizable functional group that becomes ionized when exposed to acid or when placed in an acidic medium. Exemplary acid-ionizable functional groups include a primary amine, secondary amine, tertiary amine, quaternary amine, aromatic amine, unsaturated amine, primary thiol, secondary thiol, sulfonium, hydroxyl, enol and others known to those of ordinary skill in the chemical arts.

The degree to which an acid-ionizable agent is bound by non-covalent ionic binding versus inclusion complexation formation can be determined spectrometrically using methods such as $^1$H-NMR, $^{13}$C-NMR, or circular dichroism, for example, and by analysis of the phase solubility data for the acid-ionizable agent and anionic derivatized cyclodextrin. The artisan of ordinary skill in the art will be able to use these conventional methods to approximate the amount of each type of binding that is occurring in solution to determine whether or not binding between the species is occurring predominantly by non-covalent ionic binding or inclusion complex formation. Under conditions where non-covalent ionic bonding predominates over inclusion complex formation, the amount of inclusion complex formation, measured by NMR or circular dichroism, will be reduced even though the phase solubility data indicates significant binding between the species under those conditions; moreover, the intrinsic solubility of the acid-ionizable agent, as determined from the phase solubility data, will generally be higher than expected under those conditions.

As used herein, the term "non-covalent ionic bond" refers to a bond formed between an anionic species and a cationic species. A bond is non-covalent such that the two species together form a salt or ion pair. An anionic derivatized cyclodextrin provides the anionic species of the ion pair and the acid-ionizable agent provides the cationic species of the ion pair. Since an anionic derivatized cyclodextrin is multivalent, an alkylated cyclodextrin can form an ion pair with one or more acid-ionizable or otherwise cationic agents.

A liquid formulation of the disclosure can be converted to a solid formulation for reconstitution. A reconstitutable solid composition according to the disclosure comprises an active agent, a derivatized cyclodextrin and optionally at least one other pharmaceutical excipient. A reconstitutable composition can be reconstituted with an aqueous liquid to form a liquid formulation that is preserved. The composition can comprise an admixture (minimal to no presence of an inclusion complex) of a solid derivatized cyclodextrin and an active agent-containing solid and optionally at least one solid pharmaceutical excipient, such that a major portion of the active agent is not complexed with the derivatized cyclodextrin prior to reconstitution. Alternatively, the composition can comprise a solid mixture of a derivatized cyclodextrin and an active agent, wherein a major portion of the active agent is complexed with the derivatized cyclodextrin prior to reconstitution. A reconstitutable solid composition can also comprise a derivatized cyclodextrin and an active agent where substantially all or at least a major portion of the active agent is complexed with the derivatized cyclodextrin.

A reconstitutable solid composition can be prepared according to any of the following processes. A liquid formulation of the disclosure is first prepared, then a solid is formed by lyophilization (freeze-drying), spray-drying, spray freeze-drying, antisolvent precipitation, aseptic spray drying, various processes utilizing supercritical or near supercritical fluids, or other methods known to those of ordinary skill in the art to make a solid for reconstitution.

A liquid vehicle included in a formulation of the disclosure can comprise an aqueous liquid carrier (e.g., water), an aqueous alcohol, an aqueous organic solvent, a non-aqueous liquid carrier, and combinations thereof.

The formulation of the present disclosure can include one or more pharmaceutical excipients such as a conventional preservative, antifoaming agent, antioxidant, buffering agent, acidifying agent, alkalizing agent, bulking agent, colorant, complexation-enhancing agent, cryoprotectant, electrolyte, glucose, emulsifying agent, oil, plasticizer, solubility-enhancing agent, stabilizer, tonicity modifier, flavors, sweeteners, adsorbents, antiadherent, binder, diluent, direct compression excipient, disintegrant, glidant, lubricant, opaquant, polishing agent, complexing agents, fragrances, other excipients known by those of ordinary skill in the art for use in formulations, combinations thereof.

As used herein, the term "adsorbent" is intended to mean an agent capable of holding other molecules onto its surface by physical or chemical (chemisorption) means. Such compounds include, by way of example and without limitation, powdered and activated charcoal and other materials known to one of ordinary skill in the art.

As used herein, the term "alkalizing agent" is intended to mean a compound used to provide alkaline medium for product stability. Such compounds include, by way of example and without limitation, ammonia solution, ammonium carbonate, diethanolamine, monoethanolamine, potassium hydroxide, sodium borate, sodium carbonate, sodium bicarbonate, sodium hydroxide, triethanolamine, diethanolamine, organic amine base, alkaline amino acids and trolamine and others known to those of ordinary skill in the art.

As used herein, the term "acidifying agent" is intended to mean a compound used to provide an acidic medium for product stability. Such compounds include, by way of example and without limitation, acetic acid, acidic amino acids, citric acid, fumaric acid and other α-hydroxy acids, hydrochloric acid, ascorbic acid, phosphoric acid, sulfuric acid, tartaric acid and nitric acid and others known to those of ordinary skill in the art.

As used herein, the term "antiadherent" is intended to mean an agent that prevents the sticking of solid dosage formulation ingredients to punches and dies in a tableting machine during production. Such compounds include, by way of example and without limitation, magnesium stearate, talc, calcium stearate, glyceryl behenate, polyethylene glycol, hydrogenated vegetable oil, mineral oil, stearic acid and other materials known to one of ordinary skill in the art.

As used herein, the term "binder" is intended to mean a substance used to cause adhesion of powder particles in solid dosage formulations. Such compounds include, by way of example and without limitation, acacia, alginic acid, carboxymethylcellulose sodium, poly(vinylpyrrolidone), a compressible sugar, ethylcellulose, gelatin, liquid glucose, methylcellulose, povidone and pregelatinized starch and other materials known to one of ordinary skill in the art.

When needed, binders can also be included in the dosage forms. Exemplary binders include acacia, tragacanth, gelatin, starch, cellulose materials such as methyl cellulose and sodium carboxymethylcellulose, alginic acids and salts thereof, polyethylene glycol, guar gum, polysaccharide, bentonites, sugars, invert sugars, poloxamers (PLURONIC™ F68, PLURONIC™ F127), collagen, albumin, gelatin, cellulosics in non-aqueous solvents, combinations thereof and others known to those of ordinary skill in the art. Other binders include, for example, polypropylene glycol, polyoxyethylene-polypropylene copolymer, polyethylene ester, polyethylene sorbitan ester, polyethylene oxide, combinations thereof and other materials known to one of ordinary skill in the art.

As used herein, a conventional preservative is a compound used to at least reduce the rate at which bioburden increases, but maintains bioburden steady or reduces bioburden after contamination. Such compounds include, by way of example and without limitation, benzalkonium chloride, benzethonium chloride, benzoic acid, benzyl alcohol, cetylpyridinium chloride, chlorobutanol, phenol, phenylethyl alcohol, phenylmercuric nitrate, phenylmercuric acetate, thimerosal, metacresol, myristylgamma picolinium chloride, potassium benzoate, potassium sorbate, sodium benzoate, sodium propionate, sorbic acid, thymol, and methyl, ethyl, propyl or butyl parabens and others known to those of ordinary skill in the art. It is understood that some preservatives can interact with the alkylated cyclodextrin thus reducing the preservative effectiveness. Nevertheless, by adjusting the choice of preservative and the concentrations of preservative and the alkylated cyclodextrin adequately preserved formulations can be found.

As used herein, the term "diluent" or "filler" is intended to mean an inert substance used as a filler to create the desired bulk, flow properties, and compression characteristics in the preparation of a liquid or solid dosage form. Such compounds include, by way of example and without limitation, a liquid vehicle (e.g., water, alcohol, solvents, and the like), dibasic calcium phosphate, kaolin, lactose, dextrose, magnesium carbonate, sucrose, mannitol, microcrystalline cellulose, powdered cellulose, precipitated calcium carbonate, sorbitol, and starch and other materials known to one of ordinary skill in the art.

As used herein, the term "direct compression excipient" is intended to mean a compound used in compressed solid dosage forms. Such compounds include, by way of example and without limitation, dibasic calcium phosphate, and other materials known to one of ordinary skill in the art.

As used herein, the term "antioxidant" is intended to mean an agent that inhibits oxidation and thus is used to prevent the deterioration of preparations by the oxidative process. Such compounds include, by way of example and without limitation, acetone, potassium metabisulfite, potassium sulfite, ascorbic acid, ascorbyl palmitate, citric acid, butylated hydroxyanisole, butylated hydroxytoluene, hypophosphorous acid, monothioglycerol, propyl gallate, sodium ascorbate, sodium citrate, sodium sulfide, sodium sulfite, sodium bisulfite, sodium formaldehyde sulfoxylate, thioglycolic acid, EDTA, pentetate, and sodium metabisulfite and others known to those of ordinary skill in the art.

As used herein, the term "buffering agent" is intended to mean a compound used to resist change in pH upon dilution or addition of acid or alkali. Such compounds include, by way of example and without limitation, acetic acid, sodium acetate, adipic acid, benzoic acid, sodium benzoate, boric acid, sodium borate, citric acid, glycine, maleic acid, monobasic sodium phosphate, dibasic sodium phosphate, 4-(2-hydroxyethyl)-1-piperazineethanesulfonic acid, lactic acid, tartaric acid, potassium metaphosphate, potassium phosphate, monobasic sodium acetate, sodium bicarbonate, tris, sodium tartrate and sodium citrate anhydrous and dihydrate and others known to those of ordinary skill in the art.

A complexation-enhancing agent can be added to a formulation of the disclosure. When such an agent is present, the ratio of cyclodextrin/active agent can be changed. A complexation-enhancing agent is a compound, or compounds, that enhance(s) the complexation of the active agent with the cyclodextrin. Suitable complexation enhancing agents include one or more pharmacologically inert water-soluble polymers, hydroxy acids, and other organic compounds typically used in preserved formulations to enhance the complexation of a particular agent with cyclodextrins.

Hydrophilic polymers can be used as complexation-enhancing, solubility-enhancing and/or water activity reducing agents to improve the performance of formulations containing a CD-based preservative. Loftsson has disclosed a number of polymers suitable for combined use with a cyclodextrin (underivatized or derivatized) to enhance the performance and/or properties of the cyclodextrin. Suitable polymers are disclosed in *Pharmazie* 56:746 (2001); *Int. J. Pharm.* 212:29 (2001); Cyclodextrin: From Basic Research to Market, 10th Int'l Cyclodextrin Symposium, Ann Arbor, MI, US, May 21-24, p. 10-15 (2000); PCT Int'l Pub. No. WO 99/42111; *Pharmazie* 53:733 (1998); *Pharm. Technol. Eur.* 9:26 (1997); *J. Pharm. Sci.* 85:1017 (1996); European Patent Appl. No. 0 579 435; Proc. of the 9th Int'l Symposium on Cyclodextrins, Santiago de Comostela, E S, May 31-Jun. 3, 1998, pp. 261-264 (1999); *S.T.P. Pharma Sciences* 9:237 (1999); *Amer. Chem. Soc. Symposium Series* 737 (Polysaccharide Applications):24-45 (1999); *Pharma. Res.* 15:1696 (1998); *Drug Dev. Ind. Pharm.* 24:365 (1998); *Int. J. Pharm.* 163:115 (1998); Book of Abstracts, 216th Amer. Chem. Soc. Nat'l Meeting, Boston, August 23-27 CELL-016 (1998); *J. Controlled Release* 44:95 (1997); *Pharm. Res.* (1997) 14(11), S203; *Invest. Ophthalmol. Vis. Sci.* 37:1199 (1996); Proc. of the 23rd Int'l Symposium on Controlled Release of Bioactive Materials 453-454 (1996); *Drug Dev. Ind. Pharm.* 22:401 (1996); Proc. of the 8th Int'l Symposium on Cyclodextrins, Budapest, HU, Mar. 31-Apr. 2, 1996, pp. 373-376 (1996); *Pharma. Sci.* 2:277 (1996); *Eur. J. Pharm. Sci.* 4S:S144 (1996); 3rd Eur. Congress of Pharma. Sci. Edinburgh, Scotland, UK Sep. 15-17, 1996; *Pharmazie* 51:39 (1996); *Eur. J. Pharm. Sci.* 4S:S143 (1996); U.S. Pat. Nos. 5,472,954 and 5,324,718; *Int. J. Pharm.* 126:73 (1995); Abstracts of Papers of the Amer. Chem. Soc. 209:33-CELL (1995); *Eur. J. Pharm. Sci.* 2:297 (1994); *Pharm. Res.* 11:S225 (1994); *Int. J. Pharm.* 104:181 (1994); and *Int. J. Pharm.* 110:169 (1994), the entire disclosures of which are hereby incorporated by reference in their entirety.

Other suitable polymers are well-known excipients commonly used in the field of pharmaceutical formulations and are included in, for example, *Remington's Pharmaceutical*

*Sciences,* 18th ed., pp. 291-294, A. R. Gennaro (editor), Mack Publishing Co., Easton, P A (1990); A. Martin et al., *Physical Pharmacy. Physical Chemical Principles in Pharmaceutical Sciences,* 3d ed., pp. 592-638 (Lea & Febinger, Philadelphia, P A (1983); A. T. Florence et al., *Physicochemical Principles of Pharmacy,* 2d ed., pp. 281-334, MacMillan Press, London, UK (1988), the disclosures of which are incorporated herein by reference in their entirety. Still other suitable polymers include water-soluble natural polymers, water-soluble semi-synthetic polymers (such as the water-soluble derivatives of cellulose) and water-soluble synthetic polymers. The natural polymers include polysaccharides such as inulin, pectin, algin derivatives (e.g. sodium alginate) and agar, and polypeptides such as casein and gelatin. The semi-synthetic polymers include cellulose derivatives such as methylcellulose, hydroxyethylcellulose, hydroxypropylcellulose, their mixed ethers such as hydroxypropylmethylcellulose and other mixed ethers such as hydroxyethyl-ethylcellulose and hydroxypropylethylcellulose, hydroxypropylmethylcellulose phthalate and carboxymethylcellulose and its salts, especially sodium carboxymethylcellulose. The synthetic polymers include polyoxyethylene derivatives (polyethylene glycols) and polyvinyl derivatives (polyvinyl alcohol, polyvinylpyrrolidone and polystyrene sulfonate) and various copolymers of acrylic acid (e.g. carbomer). Other natural, semi-synthetic and synthetic polymers not named here which meet the criteria of water solubility, pharmaceutical acceptability and pharmacological inactivity are likewise considered to be within the ambit of the present disclosure.

As used herein, a fragrance is a relatively volatile substance or combination of substances that produces a detectable aroma, odor or scent. Exemplary fragrances include those generally accepted as safe by the U.S. Food and Drug Administration.

As used herein, the term "glidant" is intended to mean an agent used in solid dosage formulations to promote flowability of the solid mass. Such compounds include, by way of example and without limitation, colloidal silica, cornstarch, talc, calcium silicate, magnesium silicate, colloidal silicon, tribasic calcium phosphate, silicon hydrogel and other materials known to one of ordinary skill in the art.

As used herein, the term "lubricant" is intended to mean a substance used in solid dosage formulations to reduce friction during compression. Such compounds include, by way of example and without limitation, calcium stearate, magnesium stearate, polyethylene glycol, talc, mineral oil, stearic acid, and zinc stearate and other materials known to one of ordinary skill in the art.

As used herein, the term "opaquant" is intended to mean a compound used to render a coating opaque. An opaquant can be used alone or in combination with a colorant. Such compounds include, by way of example and without limitation, titanium dioxide, talc and other materials known to one of ordinary skill in the art.

As used herein, the term "polishing agent" is intended to mean a compound used to impart an attractive sheen to solid dosage forms. Such compounds include, by way of example and without limitation, carnauba wax, white wax and other materials known to one of ordinary skill in the art.

As used herein, the term "disintegrant" is intended to mean a compound used in solid dosage forms to promote the disruption of the solid mass into smaller particles which are more readily dispersed or dissolved. Exemplary disintegrants include, by way of example and without limitation, starches such as corn starch, potato starch, pre-gelatinized and modified starches thereof, sweeteners, clays, bentonite, microcrystalline cellulose (e.g., AVICEL®), carboxymethylcellulose calcium, croscarmellose sodium, alginic acid, sodium alginate, cellulose polacrilin potassium (e.g., Amberlite®), alginates, sodium starch glycolate, gums, agar, guar, locust bean, karaya, pectin, tragacanth, crospovidone and other materials known to one of ordinary skill in the art.

As used herein, the term "stabilizer" is intended to mean a compound used to stabilize the therapeutic agent against physical, chemical, or biochemical process which would reduce the therapeutic activity of the agent. Suitable stabilizers include, by way of example and without limitation, albumin, sialic acid, creatinine, glycine and other amino acids, niacinamide, sodium acetyltryptophonate, zinc oxide, sucrose, glucose, lactose, sorbitol, mannitol, glycerol, polyethylene glycols, sodium caprylate and sodium saccharin and other known to those of ordinary skill in the art.

As used herein, the term "tonicity modifier" is intended to mean a compound or compounds that can be used to adjust the tonicity of the liquid formulation. Suitable tonicity modifiers include glycerin, lactose, mannitol, dextrose, sodium chloride, sodium sulfate, sorbitol, trehalose and others known to those of ordinary skill in the art. In some embodiments, the tonicity of the liquid formulation approximates the tonicity of blood or plasma.

As used herein, the term "antifoaming agent" is intended to mean a compound or compounds that prevents or reduces the amount of foaming that forms on the surface of the liquid formulation. Suitable antifoaming agents include dimethicone, simethicone, octoxynol and others known to those of ordinary skill in the art.

As used herein, the term "bulking agent" is intended to mean a compound used to add bulk to the solid product and/or assist in the control of the properties of the formulation during lyophilization. Such compounds include, by way of example and without limitation, dextran, trehalose, sucrose, polyvinylpyrrolidone, lactose, inositol, sorbitol, dimethylsulfoxide, glycerol, albumin, calcium lactobionate, and others known to those of ordinary skill in the art.

As used herein, the term "cryoprotectant" is intended to mean a compound used to protect an active therapeutic agent from physical or chemical degradation during lyophilization. Such compounds include, by way of example and without limitation, dimethyl sulfoxide, glycerol, trehalose, propylene glycol, polyethylene glycol, and others known to those of ordinary skill in the art.

As used herein, the term "emulsifier" or "emulsifying agent" is intended to mean a compound added to one or more of the phase components of an emulsion for the purpose of stabilizing the droplets of the internal phase within the external phase. Such compounds include, by way of example and without limitation, lecithin, polyoxylethylene-polyoxypropylene ethers, polyoxylethylene-sorbitan monolaurate, polysorbates, sorbitan esters, stearyl alcohol, tyloxapol, tragacanth, xanthan gum, acacia, agar, alginic acid, sodium alginate, bentonite, carbomer, sodium carboxymethylcellulose, cholesterol, gelatin, hydroxyethyl cellulose, hydroxypropyl cellulose, octoxynol, oleyl alcohol, polyvinyl alcohol, povidone, propylene glycol monostearate, sodium lauryl sulfate, and others known to those of ordinary skill in the art.

A solubility-enhancing agent can be added to the formulation of the present disclosure. A solubility-enhancing agent is a compound, or compounds, that enhance(s) the solubility of the active agent when in a liquid formulation. When such an agent is present, the ratio of cyclodextrin/active agent can be changed. Suitable solubility enhancing agents include one or more organic solvents, detergents, soaps, surfactant and other organic compounds typically used in parenteral formulations to enhance the solubility of a particular agent.

Suitable organic solvents include, for example, ethanol, glycerin, polyethylene glycols, propylene glycol, poloxomers, and others known to those of ordinary skill in the art.

Formulations comprising the alkylated cyclodextrin of the present disclosure can include oils (e.g., fixed oils, peanut oil, sesame oil, cottonseed oil, corn oil olive oil, and the like), fatty acids (e.g., oleic acid, stearic acid, isostearic acid, and the like), fatty acid esters (e.g., ethyl oleate, isopropyl myristate, and the like), fatty acid glycerides, acetylated fatty acid glycerides, and combinations thereof. Formulations comprising the alkylated cyclodextrin of the present disclosure can also include alcohols (e.g., ethanol, isopropanol, hexadecyl alcohol, glycerol, propylene glycol, and the like), glycerol ketals (e.g., 2,2-dimethyl-1,3-dioxolane-4-methanol, and the like), ethers (e.g., poly(ethylene glycol) 450, and the like), petroleum hydrocarbons (e.g., mineral oil, petrolatum, and the like), water, surfactants, suspending agents, emulsifying agents, and combinations thereof.

It should be understood, that compounds used in the art of pharmaceutical formulations generally serve a variety of functions or purposes. Thus, if a compound named herein is mentioned only once or is used to define more than one term herein, its purpose or function should not be construed as being limited solely to that named purpose(s) or function(s).

Formulations comprising the alkylated cyclodextrin of the present disclosure can also include biological salt(s), sodium chloride, potassium chloride, and other electrolyte(s).

Since some active agents are subject to oxidative degradation, a liquid formulation according to the disclosure can be substantially oxygen-free. For example, the headspace of a container containing a liquid formulation can made oxygen-free, substantially oxygen-free, or oxygen-reduced by purging the headspace with an inert gas (e.g., nitrogen, argon, carbon dioxide, and the like), or by bubbling an inert gas through a liquid formulation. For long-term storage, a liquid formulation containing an active agent subject to oxidative degradation can be stored in an oxygen-free or oxygen-reduced environment. Removal of oxygen from the formulation will enhance preservation of the formulation against aerobic microbes; whereas, addition of oxygen to the formulation will enhance preservation against anaerobic microbes.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

As used herein, the term "patient" or "subject" are taken to mean warm blooded animals such as mammals, for example, cats, dogs, mice, guinea pigs, horses, bovine cows, sheep, non-humans, and humans.

A formulation of the disclosure will comprise an active agent present in an effective amount. By the term "effective amount," is meant the amount or quantity of active agent that is sufficient to elicit the required or desired response, or in other words, the amount that is sufficient to elicit an appreciable biological response when administered to a subject.

The compositions of the present disclosure can be present in formulations for dosage forms such as a reconstitutable solid, tablet, capsule, pill, troche, patch, osmotic device, stick, suppository, implant, gum, effervescent composition, injectable liquid, ophthalmic or nasal solutions, or inhalable powders or solutions.

The disclosure also provides methods of preparing a liquid formulation comprising one or more active agents and an alkylated cyclodextrin, wherein the alkylated cyclodextrin comprises an alkylated cyclodextrin. A first method comprises: forming a first aqueous solution comprising an alkylated cyclodextrin composition; forming a second solution or suspension comprising one or more active agents; and mixing the first and second solutions to form a liquid formulation. A similar second method comprises adding one or more active agents directly to a first solution without formation of the second solution. A third method comprises adding an alkylated cyclodextrin directly to a solution/ suspension containing one or more active agents. A fourth method comprises adding a solution comprising one or more active agents to a powdered or particulate alkylated cyclodextrin composition. A fifth method comprises adding one or more active agents directly to a powdered or particulate alkylated cyclodextrin composition, and adding the resulting mixture to a second solution. A sixth method comprises creating a liquid formulation by any of the above methods and then isolating a solid material by lyophilization, spray-drying, aseptic spray drying, spray-freeze-drying, antisolvent precipitation, a process utilizing a supercritical or near supercritical fluid, or another method known to those of ordinary skill in the art to make a powder for reconstitution.

Specific embodiments of the methods of preparing a liquid formulation include those wherein: 1) the method further comprises sterile filtering the formulation using a filtration medium having a pore size of 0.1 μm or larger; 2) the liquid formulation is sterilized by irradiation or autoclaving; 3) the method further comprises isolating a solid from the solution; 4) the solution is purged with nitrogen or argon or other inert pharmaceutically acceptable gas such that a substantial portion of the oxygen dissolved in, and/or in surface contact with, the solution is removed.

The disclosure also provides a reconstitutable solid pharmaceutical composition comprising one or more active agents, an alkylated cyclodextrin composition and optionally at least one other pharmaceutical excipient. When this composition is reconstituted with an aqueous liquid to form a preserved liquid formulation, it can be administered by injection, infusion, topically, by inhalation or orally to a subject.

Some embodiments of the reconstitutable solid pharmaceutical composition includes those wherein: 1) the pharmaceutical composition comprises an admixture of an alkylated cyclodextrin composition and a solid comprising one or more active agents and optionally at least one solid pharmaceutical excipient, such that a major portion of the active agent is not complexed with an alkylated cyclodextrin prior to reconstitution; and/or 2) the composition comprises a solid mixture of an alkylated cyclodextrin composition and one or more active agents, wherein a major portion of the one or more active agents is complexed with the alkylated cyclodextrin prior to reconstitution.

A composition of the present disclosure can be used in a pharmaceutical dosage form, pharmaceutical composition or other such combination of materials. These alkylated cyclodextrin compositions are also useful as, but not limited to, analytical reagents, food and cosmetics adjuvants and/or additives, and as environmental clean-up agents.

CONCLUSION

Various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

All of the various aspects, embodiments, and options described herein can be combined in any and all variations.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A process for preparing an alkylated cyclodextrin composition, the process comprising:
   (a) mixing a starting cyclodextrin with an alkylating agent to form a reaction milieu comprising an alkylated cyclodextrin;
   (b) conducting a first one or more separations to form a first solution comprising the alkylated cyclodextrin, wherein the one of more separations comprises diafiltration through an ultrafiltration membrane;
   (c) treating the first solution with an activated carbon to produce a second alkylated cyclodextrin solution; and
   (d) conducting a second one or more separations to form a third alkylated cyclodextrin solution, wherein the one or more separations comprises nanofiltration through a nanofiltration membrane;
   wherein the alkylated cyclodextrin is a sulfoalkyl ether cyclodextrin of Formula (II):

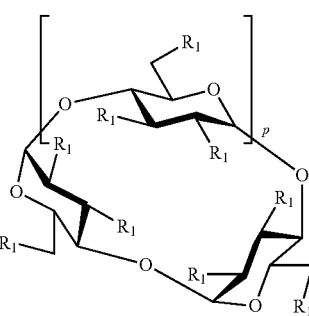

Formula (II)

wherein p is 4, 5, or 6, and $R_1$ is independently selected at each occurrence from —OH or —O—($C_2$-$C_6$ alkylene)-$SO_3^-$-T, wherein T is independently selected at each occurrence from pharmaceutically acceptable cations, provided that at least one $R_1$ is —OH and at least one $R_1$ is O—($C_2$-$C_6$ alkylene)-$SO_3^-$-T.

2. The process of claim 1, wherein solvent is added to dilute the reaction milieu formed in step (a) prior to conducting the first one or more separations.

3. The process of claim 2, wherein the solvent is water.

4. The process of claim 1, wherein the concentration of the alkylated cyclodextrin in step (b) is less than 10% (w/w) prior to the first one or more separations.

5. The process of claim 1, wherein the concentration of the alkylated cyclodextrin in step (b) is from about 3% (w/w) to about 8% (w/w) prior to the first one or more separations.

6. The process of claim 1, wherein the ultrafiltration membrane in step (b) has a molecular weight cut-off (MWCO) of about 1000 Da or lower.

7. The process of claim 1, wherein the ultrafiltration membrane in step (b) has a MWCO of about 500 to about 1000 Da.

8. The process of claim 1, wherein the activated carbon of step (c) is prepared by a method comprising the step of subjecting the activated carbon to an initial carbon washing process comprising adding a portion of the first solution comprising the alkylated cyclodextrin from step (b) to the carbon, soaking the carbon in the first solution, and eluting and discarding the solution; and, wherein the activated carbon of step (c) is further subjected to a washing process comprising flowing water over the carbon after the initial carbon washing process and eluting the water.

9. The process of claim 8, wherein the eluted wash water has a residual conductivity of 10 μS/cm or less; or wherein the activated carbon is phosphate free; or wherein the activated carbon is steam activated; or wherein the activated carbon is granular.

10. The process of claim 1, wherein the concentration of the alkylated cyclodextrin in the second alkylated cyclodextrin solution introduced into step (d) is from about 3% (w/w) to about 8% (w/w).

11. The process of claim 1, wherein the concentration of the alkylated cyclodextrin in the second alkylated cyclodextrin solution introduced into step (d) is from about 4% (w/w) to about 7% (w/w).

12. The process of claim 1, wherein the nanofiltration membrane in step (d) has a MWCO of about 500 Da or lower.

13. The process of claim 1, wherein the nanofiltration membrane in step (d) has a MWCO of about 150-500 Da.

14. The process claim 1, wherein the nanofiltration of step (d) is conducted for a period of 30 minutes to 12 hours.

15. The process of claim 1, wherein the nanofiltration of step (d) is conducted for a period of about 1 hour to about 3 hours.

16. The process of claim 1, wherein the concentration of the alkylated cyclodextrin in the third alkylated cyclodextrin solution is from about 10% (w/w) to about 25% (w/w).

17. The process of claim 1, further comprising concentrating the third alkylated cyclodextrin solution for a period of about 2 hours to about 24 hours to form a fourth alkylated cyclodextrin solution.

18. The process of claim 1, further comprising concentrating the third alkylated cyclodextrin solution for a period of about 9 hours to form a fourth alkylated cyclodextrin solution.

19. The process of claim 17, wherein the concentrating the third alkylated cyclodextrin solution is performed by distillation.

20. The process of claim 17, wherein the concentration of the fourth alkylated cyclodextrin solution is from about 30% (w/w) to about 70% (w/w).

21. The process of claim 1, further comprising removing the solvent from the fourth alkylated cyclodextrin solution to form a solid alkylated cyclodextrin, wherein the solvent is removed by distillation, lyophilization, or spray-drying.

22. The process of claim 21, wherein the solid alkylated cyclodextrin comprises less than 500 ppm of a phosphate.

23. The process of claim 21, wherein the solid alkylated cyclodextrin comprises less than 0.05% (w/w) of a chloride.

24. The process of claim 21, wherein the solid alkylated cyclodextrin comprises less than 0.002% (w/w) of a chloride.

25. The process of claim 1, wherein the process comprises preparing a single batch of alkylated cyclodextrin wherein the initial cyclodextrin has a mass greater than 275 kg.

26. The process of claim 1, wherein the alkylated cyclodextrin has an average degree of substitution of 2 to 9.

27. The process of claim 1, wherein the alkylated cyclodextrin has an average degree of substitution of 6 to 7.5.

28. The process of claim 1, wherein $R_1$ is independently selected at each occurrence from —OH or —O—($C_4$ alkylene)-$SO_3^-$-T, and -T is $Na^+$ at each occurrence.

29. The process of claim 21, further comprising combining the solid alkylated cyclodextrin with one or more excipients.

30. The process of claim 21, further comprising combining the solid alkylated cyclodextrin with an active agent.

31. A product prepared by the process of claim 1.

\*  \*  \*  \*  \*